US008253865B2

(12) United States Patent
Anderson, Jr. et al.

(10) Patent No.: US 8,253,865 B2
(45) Date of Patent: *Aug. 28, 2012

(54) AUDIO/VIDEO ENTERTAINMENT SYSTEM AND METHOD

(75) Inventors: Tazwell L. Anderson, Jr., Atlanta, GA (US); Mark A. Wood, Boca Raton, FL (US)

(73) Assignee: Immersion Entertainment, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/969,139

(22) Filed: Dec. 15, 2010

(65) Prior Publication Data
US 2011/0083158 A1 Apr. 7, 2011

Related U.S. Application Data

(60) Continuation of application No. 11/702,716, filed on Feb. 5, 2007, now Pat. No. 7,859,597, which is a division of application No. 10/159,666, filed on May 30, 2002, now Pat. No. 7,210,160, which is a continuation-in-part of application No. 09/322,411, filed on May 28, 1999, now Pat. No. 6,578,203, and a continuation-in-part of application No. 09/386,613, filed on Aug. 31, 1999, now Pat. No. 7,124,425, and a continuation-in-part of application No. 09/837,128, filed on Apr. 18, 2001, now abandoned.

(51) Int. Cl.
*H04N 7/16* (2011.01)
*H04N 5/445* (2011.01)

(52) U.S. Cl. ......... 348/725; 455/556; 455/557; 725/78; 725/80; 725/83; 725/85

(58) Field of Classification Search .................. 348/725, 348/552, 553, 723; 725/132, 78, 80, 83, 725/85; 340/825.69, 825.72; 455/555–557
See application file for complete search history.

(56) References Cited

U.S. PATENT DOCUMENTS 4,472,830 A 9/1984 Nagai
4,479,150 A 10/1984 Ilmer et al.
(Continued)

FOREIGN PATENT DOCUMENTS
GB 2372892 9/2002
(Continued)

OTHER PUBLICATIONS

Ron Glover; "Armchair Baseball From the Web—or Your Stadium Seat"; copyright 1998; The McGraw-Hill Companies, Inc.; 2 pgs.
(Continued)

*Primary Examiner* — Paulos Natnael
(74) *Attorney, Agent, or Firm* — The Small Patent Law Group LLC

(57) ABSTRACT

The preferred embodiment of the present invention provides a system and method for programming and/or charging one or more audio/video devices such that the audio/video devices will be programmed and charged to receive transmitted audio and video signals associated with an event, allowing a user to use the audio/video device to observe the sights and sounds of the event. A preferred embodiment of the present invention includes a cart with a docking port for each of a plurality of personal audio/video devices, a charger configured to charge the power source of each personal audio/video display device, and programming logic configured to program each of the personal audio/video devices.

27 Claims, 15 Drawing Sheets

U.S. PATENT DOCUMENTS

| | | | |
|---|---|---|---|
| 4,486,897 | A | 12/1984 | Nagai |
| 4,504,861 | A | 3/1985 | Dougherty |
| 4,572,323 | A | 2/1986 | Randall |
| 4,580,174 | A | 4/1986 | Tokunaka |
| 4,605,950 | A | 8/1986 | Goldberg et al. |
| 4,615,050 | A | 10/1986 | Lonnstedt |
| 4,620,068 | A | 10/1986 | Wieder |
| 4,727,585 | A | 2/1988 | Flygstad |
| 4,764,817 | A | 8/1988 | Blazek et al. |
| 4,802,243 | A | 2/1989 | Griffiths |
| 4,809,079 | A | 2/1989 | Blazek et al. |
| 4,855,827 | A | 8/1989 | Best |
| 4,856,118 | A | 8/1989 | Sapiejewski |
| 4,864,425 | A | 9/1989 | Blazek et al. |
| 4,866,515 | A | 9/1989 | Tagawa et al. |
| 4,887,152 | A | 12/1989 | Matsuzaki et al. |
| 4,965,825 | A | 10/1990 | Harvey et al. |
| 4,982,278 | A | 1/1991 | Dahl et al. |
| 5,023,707 | A | 6/1991 | Briggs |
| 5,023,955 | A | 6/1991 | Murphy, II et al. |
| 5,109,414 | A | 4/1992 | Harvey et al. |
| 5,119,442 | A | 6/1992 | Brown |
| 5,128,765 | A | 7/1992 | Dingwall et al. |
| 5,133,081 | A | 7/1992 | Mayo |
| 5,138,440 | A | 8/1992 | Radice |
| 5,138,722 | A | 8/1992 | Urella et al. |
| 5,173,721 | A | 12/1992 | Green |
| 5,179,736 | A | 1/1993 | Scanlon |
| 5,189,630 | A | 2/1993 | Barstow et al. |
| 5,237,648 | A | 8/1993 | Mills et al. |
| 5,243,415 | A | 9/1993 | Vance |
| 5,252,069 | A | 10/1993 | Lamb et al. |
| 5,289,272 | A | 2/1994 | Rabowsky et al. |
| 5,289,288 | A | 2/1994 | Silverman et al. |
| 5,297,037 | A | 3/1994 | Ifuku |
| 5,321,416 | A | 6/1994 | Bassett et al. |
| 5,359,463 | A | 10/1994 | Shirochi et al. |
| 5,392,158 | A | 2/1995 | Tosaki |
| 5,408,686 | A | 4/1995 | Mankovitz |
| 5,414,544 | A | 5/1995 | Aoyagi et al. |
| 5,440,197 | A | 8/1995 | Gleckman |
| 5,448,291 | A | 9/1995 | Wickline |
| 5,463,428 | A | 10/1995 | Lipton et al. |
| 5,481,478 | A | 1/1996 | Palmieri et al. |
| 5,485,504 | A | 1/1996 | Ohnsorge |
| 5,506,705 | A | 4/1996 | Yamamoto et al. |
| 5,510,828 | A | 4/1996 | Lutterbach |
| 5,513,384 | A | 4/1996 | Brennan et al. |
| 5,524,195 | A | 6/1996 | Clanton et al. |
| 5,546,099 | A | 8/1996 | Quint et al. |
| 5,585,850 | A | 12/1996 | Schwaller |
| 5,585,858 | A | 12/1996 | Harper et al. |
| 5,594,551 | A | 1/1997 | Monta |
| 5,600,365 | A | 2/1997 | Kondo et al. |
| 5,600,368 | A | 2/1997 | Matthews, III |
| 5,613,191 | A | 3/1997 | Hylton et al. |
| 5,617,331 | A | 4/1997 | Wakai |
| 5,627,915 | A | 5/1997 | Rosser et al. |
| 5,631,693 | A | 5/1997 | Wunderlich et al. |
| 5,642,221 | A | 6/1997 | Fischer et al. |
| 5,663,717 | A | 9/1997 | DeLuca |
| 5,668,339 | A | 9/1997 | Shin |
| 5,671,320 | A | 9/1997 | Cookson et al. |
| 5,682,172 | A | 10/1997 | Travers et al. |
| 5,696,521 | A | 12/1997 | Robinson et al. |
| 5,708,961 | A | 1/1998 | Hylton et al. |
| 5,712,950 | A | 1/1998 | Cookson et al. |
| 5,719,588 | A | 2/1998 | Johnson |
| 5,729,471 | A * | 3/1998 | Jain et al. ............ 725/131 |
| 5,729,549 | A | 3/1998 | Kostreski et al. |
| 5,742,263 | A | 4/1998 | Wang et al. |
| 5,742,521 | A * | 4/1998 | Ellenby et al. ............ 702/127 |
| 5,754,254 | A | 5/1998 | Kobayashi et al. |
| 5,760,819 | A | 6/1998 | Sklar et al. |
| 5,760,824 | A | 6/1998 | Hicks, III |
| 5,767,820 | A | 6/1998 | Bassett et al. |
| 5,793,416 | A | 8/1998 | Rostoker et al. |
| 5,806,005 | A | 9/1998 | Hull et al. |
| 5,808,695 | A | 9/1998 | Rosser et al. |
| 5,812,224 | A | 9/1998 | Maeda et al. |
| 5,815,126 | A | 9/1998 | Fan et al. |
| 5,841,122 | A | 11/1998 | Kirchhoff |
| 5,844,656 | A | 12/1998 | Ronzani et al. |
| 5,847,612 | A | 12/1998 | Birleson |
| 5,847,762 | A | 12/1998 | Canfield et al. |
| 5,867,223 | A * | 2/1999 | Schindler et al. ............ 348/552 |
| 5,867,579 | A | 2/1999 | Saito |
| 5,880,773 | A | 3/1999 | Suzuki |
| 5,892,554 | A | 4/1999 | DiCicco et al. |
| 5,894,320 | A | 4/1999 | Vancelette |
| 5,900,849 | A | 5/1999 | Gallery |
| 5,903,395 | A | 5/1999 | Rallison et al. |
| 5,920,827 | A | 7/1999 | Baer et al. |
| 5,946,635 | A | 8/1999 | Dominguez |
| D413,881 | S | 9/1999 | Ida et al. |
| 5,953,076 | A | 9/1999 | Astle et al. |
| 5,982,445 | A | 11/1999 | Eyer et al. |
| 5,990,958 | A | 11/1999 | Bheda et al. |
| 5,999,808 | A | 12/1999 | LaDue |
| 6,002,720 | A | 12/1999 | Yurt et al. |
| 6,002,995 | A | 12/1999 | Suzuki et al. |
| 6,009,336 | A | 12/1999 | Harris et al. |
| 6,016,348 | A | 1/2000 | Blatter et al. |
| 6,020,851 | A | 2/2000 | Busack |
| 6,034,716 | A | 3/2000 | Whiting et al. |
| 6,035,349 | A | 3/2000 | Ha et al. |
| 6,043,837 | A | 3/2000 | Driscoll, Jr. et al. |
| 6,052,239 | A | 4/2000 | Matsui et al. |
| 6,060,995 | A | 5/2000 | Wicks et al. |
| 6,064,860 | A | 5/2000 | Ogden |
| 6,069,668 | A | 5/2000 | Woodham, Jr. et al. |
| D426,527 | S | 6/2000 | Sakaguchi |
| 6,078,954 | A | 6/2000 | Lakey et al. |
| 6,080,063 | A | 6/2000 | Khosla |
| 6,084,584 | A | 7/2000 | Nahi et al. |
| 6,088,045 | A | 7/2000 | Lumelsky et al. |
| 6,095,423 | A | 8/2000 | Houdeau et al. |
| 6,097,441 | A | 8/2000 | Allport |
| 6,097,967 | A | 8/2000 | Hubbe et al. |
| 6,100,925 | A | 8/2000 | Rosser et al. |
| 6,104,414 | A | 8/2000 | Odryna et al. |
| 6,112,074 | A | 8/2000 | Pinder |
| 6,121,966 | A | 9/2000 | Teodosio et al. |
| 6,124,862 | A | 9/2000 | Boyken et al. |
| 6,125,259 | A | 9/2000 | Perlman |
| 6,128,143 | A | 10/2000 | Nalwa |
| 6,131,025 | A | 10/2000 | Riley et al. |
| 6,133,946 | A | 10/2000 | Cavallaro et al. |
| 6,137,525 | A | 10/2000 | Lee et al. |
| 6,144,375 | A | 11/2000 | Jain et al. |
| 6,166,734 | A | 12/2000 | Nahi et al. |
| 6,192,257 | B1 | 2/2001 | Ray |
| 6,195,090 | B1 | 2/2001 | Riggins et al. |
| 6,209,028 | B1 | 3/2001 | Walker et al. |
| 6,215,475 | B1 | 4/2001 | Meyerson et al. |
| 6,327,570 | B1 | 12/2001 | Stevens |
| 6,330,021 | B1 | 12/2001 | Devaux |
| 6,347,301 | B1 | 2/2002 | Bearden, III et al. |
| 6,351,252 | B1 | 2/2002 | Atsumi et al. |
| 6,356,905 | B1 | 3/2002 | Gershman et al. |
| 6,380,978 | B1 | 4/2002 | Adams et al. |
| 6,401,085 | B1 | 6/2002 | Gershman et al. |
| 6,417,853 | B1 | 7/2002 | Squires et al. |
| 6,421,031 | B1 | 7/2002 | Ronzani et al. |
| 6,424,369 | B1 | 7/2002 | Adair et al. |
| 6,434,403 | B1 | 8/2002 | Ausems et al. |
| 6,434,530 | B1 | 8/2002 | Sloane et al. |
| 6,463,299 | B1 | 10/2002 | Macor |
| 6,466,202 | B1 | 10/2002 | Suso et al. |
| 6,505,055 | B1 | 1/2003 | Kahn et al. |
| 6,522,352 | B1 | 2/2003 | Strandwitz et al. |
| 6,525,762 | B1 | 2/2003 | Mileski et al. |
| 6,526,580 | B2 | 2/2003 | Shimomura |
| 6,532,152 | B1 | 3/2003 | White et al. |
| 6,535,254 | B1 | 3/2003 | Olsson et al. |
| 6,535,493 | B1 | 3/2003 | Lee et al. |
| 6,549,229 | B1 | 4/2003 | Kirby et al. |

| | | | |
|---|---|---|---|
| 6,564,070 | B1 | 5/2003 | Nagamine et al. |
| 6,567,079 | B1 | 5/2003 | Smailagic et al. |
| 6,570,889 | B1 | 5/2003 | Stirling-Gallacher et al. |
| 6,574,672 | B1 | 6/2003 | Mitchell et al. |
| 6,578,203 | B1 * | 6/2003 | Anderson et al. ............. 725/141 |
| 6,597,346 | B1 | 7/2003 | Havey et al. |
| 6,624,846 | B1 | 9/2003 | Lassiter |
| 6,669,346 | B2 | 12/2003 | Metcalf |
| 6,681,398 | B1 * | 1/2004 | Verna ............................ 725/141 |
| 6,745,048 | B2 | 6/2004 | Vargas et al. |
| 6,781,635 | B1 | 8/2004 | Takeda |
| 6,782,238 | B2 * | 8/2004 | Burg et al. ......................... 434/1 |
| 6,785,814 | B1 | 8/2004 | Usami et al. |
| 6,850,777 | B1 | 2/2005 | Estes et al. |
| 6,931,290 | B2 | 8/2005 | Forest |
| 6,934,510 | B2 | 8/2005 | Katayama |
| 6,952,558 | B2 * | 10/2005 | Hardacker ................... 455/3.06 |
| 7,006,164 | B1 | 2/2006 | Morris |
| 7,149,549 | B1 * | 12/2006 | Ortiz et al. ..................... 455/566 |
| 7,210,160 | B2 * | 4/2007 | Anderson et al. ............... 725/81 |
| 7,227,952 | B2 | 6/2007 | Qawami et al. |
| 7,268,810 | B2 | 9/2007 | Yoshida |
| 7,448,063 | B2 | 11/2008 | Freeman |
| 7,859,597 | B2 * | 12/2010 | Anderson et al. ............. 348/725 |
| 2001/0016486 | A1 | 8/2001 | Ko |
| 2001/0030612 | A1 | 10/2001 | Kerber et al. |
| 2001/0034734 | A1 | 10/2001 | Whitley |
| 2001/0039180 | A1 | 11/2001 | Sibley et al. |
| 2001/0039663 | A1 | 11/2001 | Sibley |
| 2001/0042105 | A1 | 11/2001 | Koehler et al. |
| 2001/0047516 | A1 | 11/2001 | Swain et al. |
| 2002/0007490 | A1 | 1/2002 | Jeffery |
| 2002/0014275 | A1 | 2/2002 | Blatt et al. |
| 2002/0046405 | A1 | 4/2002 | Lahr |
| 2002/0052965 | A1 | 5/2002 | Dowling |
| 2002/0057365 | A1 | 5/2002 | Brown |
| 2002/0063799 | A1 | 5/2002 | Ortiz et al. |
| 2002/0069416 | A1 | 6/2002 | Stiles |
| 2002/0069419 | A1 | 6/2002 | Raverdy et al. |
| 2002/0090217 | A1 | 7/2002 | Limor et al. |
| 2002/0091723 | A1 | 7/2002 | Traner et al. |
| 2002/0095682 | A1 | 7/2002 | Ledbetter |
| 2002/0104092 | A1 | 8/2002 | Arai et al. |
| 2002/0108125 | A1 | 8/2002 | Joao |
| 2002/0115454 | A1 | 8/2002 | Hardacker |
| 2002/0130967 | A1 | 9/2002 | Sweetser |
| 2002/0138582 | A1 | 9/2002 | Chandra et al. |
| 2002/0138587 | A1 | 9/2002 | Koehler |
| 2002/0152476 | A1 | 10/2002 | Anderson et al. |
| 2003/0004793 | A1 | 1/2003 | Feuer et al. |
| 2003/0005052 | A1 | 1/2003 | Feuer et al. |
| 2003/0005437 | A1 | 1/2003 | Feuer et al. |
| 2003/0005457 | A1 | 1/2003 | Faibish |
| 2003/0014275 | A1 | 1/2003 | Bearden, III et al. |
| 2003/0023974 | A1 | 1/2003 | Dagtas et al. |
| 2003/0204630 | A1 | 10/2003 | Ng |
| 2004/0034617 | A1 | 2/2004 | Kaku |
| 2004/0073437 | A1 | 4/2004 | Halgas et al. |
| 2004/0207719 | A1 | 10/2004 | Tervo et al. |
| 2004/0243922 | A1 | 12/2004 | Sirota et al. |
| 2005/0076387 | A1 | 4/2005 | Feldmeier |
| 2006/0174297 | A1 | 8/2006 | Anderson et al. |
| 2007/0060200 | A1 | 3/2007 | Boris et al. |
| 2007/0107028 | A1 | 5/2007 | Monroe |
| 2007/0207798 | A1 | 9/2007 | Talozi et al. |
| 2007/0256107 | A1 * | 11/2007 | Anderson et al. ............... 725/81 |

FOREIGN PATENT DOCUMENTS

| | | |
|---|---|---|
| JP | 10136277 | 5/1998 |
| JP | 20010275101 | 10/2001 |
| WO | WO 9411855 | 5/1994 |
| WO | WO 9966670 | 12/1999 |
| WO | WO 0054554 | 9/2000 |
| WO | WO-04/002130 A2 | 12/2003 |
| WO | WO 2004/034617 | 4/2004 |

OTHER PUBLICATIONS

Choiceseat™ Fact Sheet; Jun. 13, 2007; 4 pgs.
ChoiceSeat—Events Operations Manual for Madison Square Garden; Dec. 15, 1999; Intel Corporation; 91 pgs.
ChoiceSeat™; www.choiceseat.net; 1999 Williams Communications; 71 pgs.
ChoiceSeat—System Administrator's Binder for Madison Square Garden; Dec. 17, 1999; 80 pgs.
ChoiceSeat—In Your Face Interactive Experience—1998 SuperBowl; Broncos v. Packers; 15 pgs.
In-Seat Interactive Advertising Device Debuts; Nov. 19, 1999; Williams; 2 pgs.
Reality Check Studios Goes Broadband with Production for Choiceseat at Madison Square Garden; Dec. 1, 1999; 3 pgs.
Press Release: Vela Research LP to Supply Encoding for ChoiceSeat at SuperBowl XXXII; Jan. 13, 1998; 2 pgs.
Ruel's Report: ChoiceSeat; ChoiceSeat makes Worldwide Debut at the 1998 Super Bowl in San Diego California; Sep. 1, 1997; 9 pgs.
San Diego Metropolitan; Jan. 1998; 29 pgs.
Stadium fans touch the future—Internet Explorer and touch screens add interactivity to Super Bowl XXXII; Jan. 26, 1998; 2 pgs.
Telephony online Intelligence for the Broadband Economy; Fans take to ChoiceSeats: Interactive technology, e-commerce expand to sporting events; Jan. 10, 2000; 2 pgs.
Williams ChoiceSeat interactive network launches inaugural season with Tampa Bay Devil Rays; expands features for second season; Mar. 30, 1998; 2 pgs.
Williams Communications; ChoiceSeat™ demonstrates the interactive evolution of sports at Super Bowl™ XXXIII; Jan. 20, 1999; 2 pgs.
Choice Seat Specification; Version 2.2; Ethernet Model; Williams Communications Group; Oct. 10, 1997; 13 pgs.
Eric Breier; Computer age comes to ballpark; Quallcomm is test site for ChoiceSeat's sports televisio Robert Carter; Web Technology: It's in the Game; SiteBuilder network; Dec. 15, 1997; 1 pg.n network; Aug. 1997; 2 pgs.
Robert Carter; Web Technology: It's in the Game; SiteBuilder network; Dec. 15, 1997; 1 pg.
ChoiceSeat™ Fact Sheet; Project: Super Bowl XXXII; Qualcomm Stadium, San Diego, Calif., USA; Jan. 25, 1998; 1 pg.
Screen Shot Super Bowl XXXII; Jan. 25, 1998; 1 pg.
Welcome to the Interactive Evolution of Sports. ChoiceSeat™; Jan. 1998; 1 pg.
The Ultimate Super Bowl Experience! Williams ChoiceSeat™ Jan. 1998; 1 pg.
Bradley J. Fikes; Super Bowl XXXII; It's just business; For lucky 600 fans, there'll be TV sets at the seats; San Diego North County Times; Jan. 1998; 1 pg.
D.R. Stewart; Williams Interactive Video Gives Football Fans Choice; Tulsa World; Jan. 1998; tulsaworld.com; 2 pgs.
Cyberscope; Just Call It Wired Bowl; Jan. 28, 1998; 1 pg.
Ruel.Net Set-Top Page Interactive TV Top.Box.News; Ruel's Report: ChoiceSeat; Fall 1998; 7 pgs.
Williams ChoiceSeat interactive network launches inaugural season with Tampa Bay Devil Rays; expands features for second season with San diego Padres; www.williams.com/newsroom/news_releases;Mar. 30, 1998; 2 pgs.
The Herald: Super Bowl Turns Techno Bowl; Jan. 24, 1999; 1 pg.
Williams communications' ChoiceSeat™ demonstrates the interactive evolution of sports at Super Bowl™ XXXIII; http://www.williams.com/newsroom/news_releases; Jan. 20, 1999; 3 pgs.
NTN Interactive games available on ChoiceSeat™ during Super Bowl XXXIII; Jan. 1999; 1 pg.
Williams Fact Sheet; Super Bowl™ XXXIII; Pro Player Stadium, Miami, Florida, USA; Jan. 31, 1999; 1 pg.
In-Seat Interactive Advertising Device Debuts; http://www.williams.com/newsroom/news_releases; Nov. 19, 1999; 2 pgs.
Intel and ChoiceSeat™ collaborate to advance interactive sports technology; http://www.williams.com/newsroom/news_releases; Nov. 29, 1999; 3 pgs.
Digital Video; ChoiceSeat Coverage; www.dv.com; Apr. 2000; 11 pgs.
Wall Street Journal; With Wired Seats, Fans Get Replays, Rules, Snacks; May 21, 2000; 1 pg.

Proposed ChoiceSeat Client Specification Summary; Initial Draft Aug. 29, 1997; Updated Sep. 30, 1997; 2 pgs.

Proposed ChoiceSeat Network Specification Summary; Initial Draft Aug. 25, 1997; 2 pgs.

Proposed ChoiceSeat Network Specification Summary; Updated Draft Sep. 30, 1997; 4 pgs.

Quallcomm Stadium ChoiceSeat Network Diagram; May 11, 1998; 5 pgs.

PCT International Search Report dated Feb. 5, 2004; In re International Application No. PCT/US03/31696.

Written Opinion cited document in International Application No. PCT/US03/31696.

Office Action dated Aug. 10, 2007; U.S. Appl. No. 10/630,069, filed Jul. 30, 2003; Applicant: Tazwell L. Anderson, Jr.; 11 pages.

Office Action dated Aug. 23, 2007; U.S. Appl. No. 09/837,128, filed Apr. 18, 2001; Applicant: Tazwell L. Anderson, Jr.; 13 pages.

Office Action dated Sep. 7, 2007; U.S. Appl. No. 10/453,385, filed Jul. 30, 2003; Applicant: Tazwell L. Anderson, Jr.; 14 pages.

Dapeng, Wu; et al; "On End-to-End Architecture for Transporting MPEG-4 Video Over the Internet'" IEEE Transaction vol. 10, No. 6, Sep. 2000, 19 pgs.

Capin, Tolga K., Petajen, Eric and Ostermann, Joern; "Efficient Modeling of Virtual Humans in MPEG-4" IEEE 2000, 4 pgs.

Battista, Stafano; Casalino, Franco and Lande, Claudio; "MPEG-4: A Multimedia Standard for the Third Millennium, Part 1"; IEEE 1999, 10 pgs.

Wireless Dimensions Corporation Adds to Mobile-Venue Suite™; Press Release, Wireless Dimensions; Allen, Texas; Jul. 26, 2000; www.wirelessdimensions.net/news.html, 6 pgs.

Seeing is Believing—Motorola and PacketVideo Demonstrate MPEG4 Video Over SPRS; Publication: Business Wire Date: Wednesday, May 10 2000; www.allbusiness.com; 4pgs.

Adamson, W.A.; Antonelli, C.J.; Coffman, K.W.; McDaniel, P.; Rees, J.; Secure Distributed Virtual Conferencing Multicast or Bust; CITI Technical Report 99-1; Jan. 25, 1999; 8 pgs.

Office Action dated Sep. 10, 2007; U.S. Appl. No. 10/680,612, filed Oct. 7, 2003; Applicant: Tazwell L. Anderson, Jr.; 19 pages.

Spanberg, Erik; "Techies Hit the Fast Track"; The Business Journal. Charlotte: Jul. 30, 1999; vol. 14, Iss. 17; p. 3.

Hiestand, Michael; Up Next: Rent Wireless Video Devices at games: [Final Edition]; USA Today; McLean, VA: Jan. 29, 2002; p. 2.

PR Newswire; Baseball Fans to Get Best of Both Worlds: Seats in the Stadium and Up Close Camera Shots; New York; Mar. 22, 2002; 2 pgs.

Sony GV S50 Video Walkman Operating Instructions; 1992; 3 pgs.

* cited by examiner

AUDIO/VIDEO ENTERTAINMENT SYSTEM AND METHOD

CROSS REFERENCE TO RELATED APPLICATION

The present application is a continuation application of copending application Ser. No. 11/702,716 filed Feb. 5, 2007 which is a divisional application of copending application Ser. No. 10/159,666, filed May 30, 2002 which was a continuation-in-part of and claims priority i) to copending non-provisional U.S. patent application entitled "Audio/Video Signal Distribution System For Head Mounted Displays," assigned Ser. No. 09/322,411, and filed May 28, 1999; to copending non-provisional U.S. patent application entitled "Audio/Video System And Method Utilizing A Head Mounted Apparatus With Noise Attenuation," assigned Ser. No. 09/386,613, and filed Aug. 31, 1999 and; iii) to copending non-provisional U.S. patent application entitled "Electronic Handheld Audio/Video Receiver And Listening/Viewing Device," assigned Ser. No. 09/837,128, and filed Apr. 18, 2001, the complete and full subject matter of which are all expressly incorporated herein by reference in their entireties.

BACKGROUND OF THE INVENTION

1. Field of the Invention

Certain embodiments of the present invention generally relate to video and audio signal processing techniques and, in particular, to a system and method for receiving video and audio signals from a plurality of sources and for providing a user with multiple combinations of these signals to select from. Certain embodiments of the present invention generally relate to an apparatus for processing video and/or audio signals and for displaying images and producing sounds based on the processed video and/or audio signals. Certain embodiments of the present invention generally relate to video and audio device programming, charging, and vending and, in particular, to a system and method for programming and charging one or more personal audio/video devices.

2. Related Art

Audio and video signals are generated from a plurality of sources during many events, For example, at an auto race, television crews usually position cameras at various locations within view of a racetrack. These cameras generate video signals defining views of the racetrack from various perspectives. In addition, microphones positioned at various locations generate audio signals defining different sounds at the auto race. For example, microphones may be located close to the race track to receive sounds produced by the vehicles participating in the race, and microphones may be located close to television commentators to receive the comments of the commentators as they observe and comment on the race. As another example, at a football game or other type of sporting event, television crews usually position cameras and microphones at various locations in the stadium.

One of the video signals and one or more of the audio signals are usually selected and combined together at a television station to form a combined video/audio signal. This signal is then modulated and transmitted so that users having a television can receive the combined signal via the television. The television demodulates the combined signal and displays an image defined by the video signal on a display screen and reproduces the sounds defined by the audio signals via speakers. Therefore, the sights and sounds of the race can be viewed and heard via the television.

In addition, one or more of the audio signals, such as audio signals defining the comments of radio commentators, are usually selected and modulated at a radio station to form a radio signal. This radio signal is then transmitted as a wireless signal so that users having radios can receive the signal via a radio. The radio demodulates the signal and reproduces the sounds defined by the radio signal via speaker.

However, users viewing and/or hearing the sights and sounds of the race or game via televisions and/or radios are not usually given the opportunity to select which video and/or audio signals are modulated and transmitted to the television and/or radio. Therefore, the user is only able to receive the signals modulated and transmitted to the television and/or radio, even though the user may prefer to receive the other audio and/or video signals that are generated at the auto race or game.

Spectators who actually attend the sporting event are usually given more options to view and/or hear the sights and/or sounds of the sporting event from different perspectives. In this regard, a plurality of monitors are usually located at particular locations in the stadium. As used herein, "stadium" shall be defined to mean any non-movable structure having a large number (i.e., thousands) of seats, wherein an event occurs at (i.e., within a close proximity of) the seats such that spectators sitting in the seats can view the event. An "event" is any occurrence viewed by a spectator.

Each monitor within the stadium receives one of the aforementioned video signals and displays an image defined by the received video signal to many of the spectators. However, the monitor does not always display a desirable perspective with respect to each spectator in the stadium, and the monitor is often located in an inconvenient location for many of the spectators. In this regard, many of the spectators often must leave their seats (or other locations) in the stadium and go to a location where the spectators, along with other spectators, can view the monitor displaying the desired perspective. The spectators viewing the monitor often do not have control over which image is displayed by the monitor.

Thus, a heretofore-unaddressed need exists in the industry for providing a system and method that enables a spectator to conveniently view an event from different perspectives.

A way to address this need is with personal audio/video devices for use by spectators at an event or for use in association with an event. However, stadiums have varying audio and video frequencies available for use in connection with various events. Different stadiums in different geographical locations will also have different audio and video frequencies available for transmission in connection with the events.

Accordingly, there also exists a need to alter or program the audio and video frequencies used by audio/video devices to ensure that one or more audio/video devices are able to receive the proper audio and video frequencies at each stadium and event. Similarly, after each use, an audio/video device may need to be charged before its next use. Accordingly, a need exists for providing and system and method for charging one or more audio/video device between uses.

SUMMARY OF THE INVENTION

The present invention overcomes the inadequacies and deficiencies of the prior art as discussed hereinbefore. In accordance with certain embodiments, a system and method are provided for providing a user with a plurality of audio and video signals defining different sounds and views associated with an event. The system includes a handheld device having a video receiver, a virtual image display device, and one or more speakers. The virtual image display device produces virtual visual images based on received video signals, and the speakers produce sounds based on the received audio signals. As a result, the user may hear the sounds produced by the speakers and may see the video images produced by the display device by holding the handheld device to the user's face, or the user may watch the event live by removing the handheld device from the user's face.

In accordance with another embodiment, the handheld device incorporates an integrated light shield/shroud to block ambient light that can interfere with the user's ability to view the virtual image. Unlike individual eye shrouds characteristic of a pair of optical binoculars, the present shroud shields both eyes at the same time. Among other advantages, the present shroud enables the user to operate the device while wearing eyeglasses or sunglasses.

In accordance with other embodiments, a system and method are provided for providing a user with a plurality of audio and video signals defining different views and sounds associated with an event while reducing the amount of external noise heard by the user. The system includes a display device, a head mount, noise reduction devices, and a speaker. The display device is coupled to the head mount and produces visual images based on received video signals. The head mount is mounted on the user's head and is coupled to the noise reduction devices, which cover the user's ears such that external noise is reduced. The noise reduction devices are coupled together via a strap that fits around the user head. The noise reduction devices are coupled to and house speakers that produce sound signals based on received audio signals. As a result, the user may see the video images produced by the display device and the sounds produced by the speaker, and the external noise heard by the user is reduced.

In accordance with another feature, the head mount has ridges formed thereon, and the noise reduction devices include notches. Once the noise reduction devices are properly positioned, the ridges are received by the notches, and the noise reduction device is, therefore, less likely to move with respect to the head mount.

In accordance with other embodiments, a system and method are provided for programming and/or charging one or more audio/video devices such that the audio/video device or devices will be properly programmed and charged to receive transmitted audio and video signals associated with an event, allowing a user to use the audio/video device to observe the sights and sounds of the event.

The system includes a cart with a securing mechanism for each of a plurality of personal audio/video devices, a charger configured to charge the power source of each personal audio/video display device, and programming logic configured to program each of the personal audio/video devices.

In accordance with another feature, the cart includes a control panel to allow the appropriate audio and video frequencies to be selected for programming the personal audio/video devices.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The preferred embodiment of the present invention will be described hereafter in the context of auto racing applications. However, the scope of the present invention should not be so limited, and it should be apparent to one skilled in the art that the principles of the present invention may be employed in the context of other applications, particularly in the context of other sporting events (e.g., football games, basketball games, baseball games, hockey matches, etc.) and at various stadiums housing the sporting events.

Figure 1:
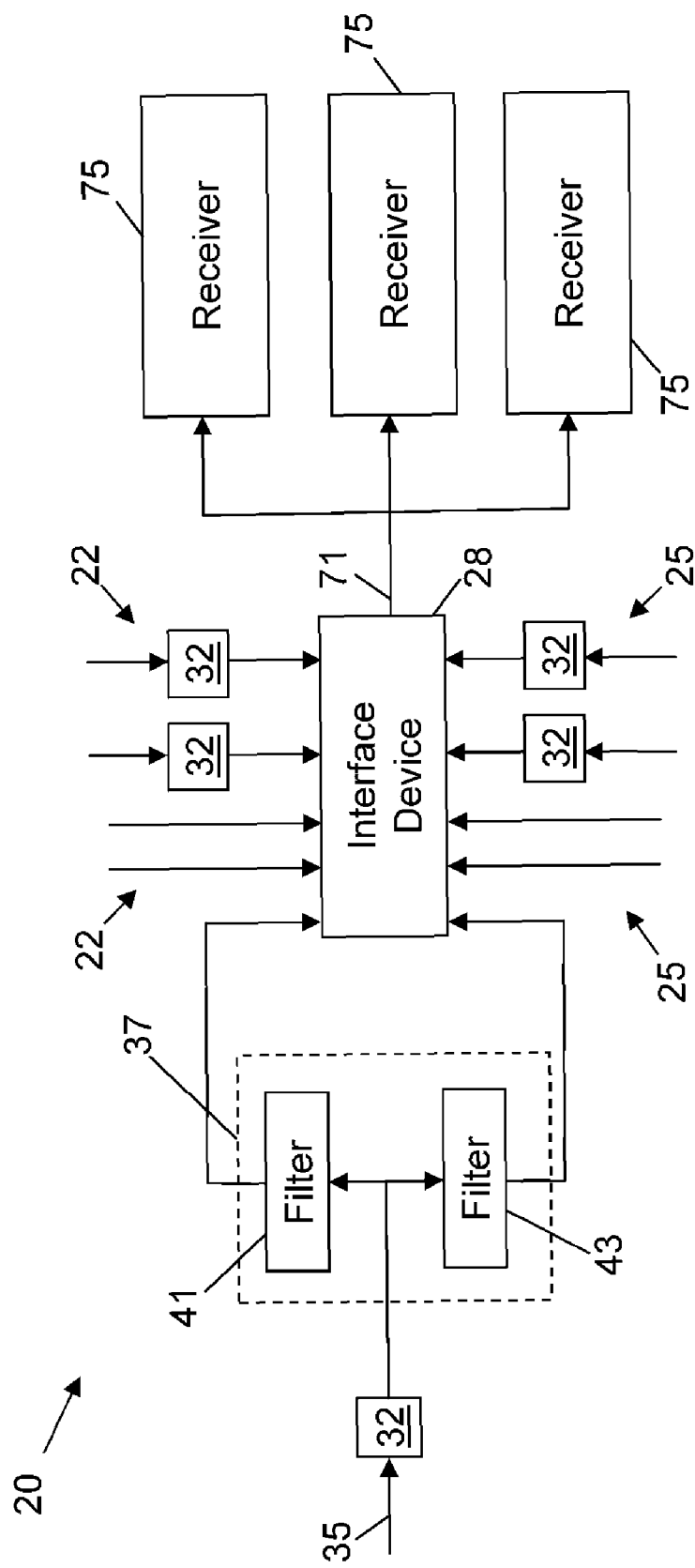
FIG. 1 is a block diagram illustrating a video/audio system in accordance with an embodiment of the present invention.

FIG. 1 depicts a video/audio system 20 implementing an embodiment of the present invention. At least one video signal 22 and at least one audio signal 25 are received by an interface device 28. Each of the received video signals 22 defines a view of the race from a different perspective. For example, the video signals 22 may be generated by different video cameras located at different locations around the stadium, including inside at least some of the vehicles participating in the race.

Furthermore, each of the audio signals 25 defines different sounds associated with the race, For example, at least one of the audio signals 25 may be generated from a microphone located close to the track or in one of the vehicles such that the audio signal 25 defines noise from the vehicles participating in the race. Alternatively, at least one of the audio signals 25 may define the comments of television commentators, and at least one of the audio signals 25 may define the comments of radio commentators. Furthermore, at least one of the audio signals 25 may define the comments between one of the drivers participating in the race and the driver's pit crew.

Some of the video and audio signals 22 and 25 can be unmodulated when transmitted to the interface device 28 and, therefore, do not need to be demodulated by the system 20. However, some of the video and audio signals 22 and 25 may need to be demodulated by the system 20. For example, at least one of the audio signals 25 defining the comments of the radio commentators may be modulated as a radio signal for transmission to radios located at or away from the stadium, and at least one of the video signals 22 may be modulated as a television signal for transmission to televisions located at or away from the stadium. In addition, the comments between a driver and the driver's pit crew are usually transmitted via ultra high frequency (UHF) radio waves, which are known to be modulated signals. Therefore, as shown by FIG. 1, the system 20 preferably includes demodulators 32 configured to receive and demodulate the video and/or audio signals 22 and 25.

It is possible for some of the video and audio signals 22 and 25 to be received from a combined signal 35, which is comprised of at least one video signal 22 combined with at least one audio signal 25. For example, the combined signal 35 may be a television signal modulated for transmission to televisions located at or away from the track stadium. To facilitate the combination of different audio signals 25 with the video signal(s) 22 defined by the combined signal 35, a separator 37 preferably separates the combined signal 35 into its respective video signal 22 and audio signal 25, as shown by FIG. 1.

Various configurations of the separator 37 may exist without departing from the principles of the present invention. FIG. 1 depicts a possible implementation of the separator 37. In this regard, the separator 37 includes an audio signal filter 41 designed to filter out any audio signals 25 from the combined signal 35 and to transmit the resulting video signal(s) 22 to interface device 28. Furthermore, the separator 37 also includes a video signal filter 43 designed to filter out any video signals 22 from the combined signal 35 and to transmit the resulting audio signal(s) 25 to interface device 28. If more than one video signal 22 or more than one audio signal 25 is included in the combined signal 35, then the separator 37 may include additional filters (not shown) to separate the multiple video and/or audio signals 22 and 25 into individual signals before transmitting the signals 22 and 25 to the interface device 28.

Figure 2:
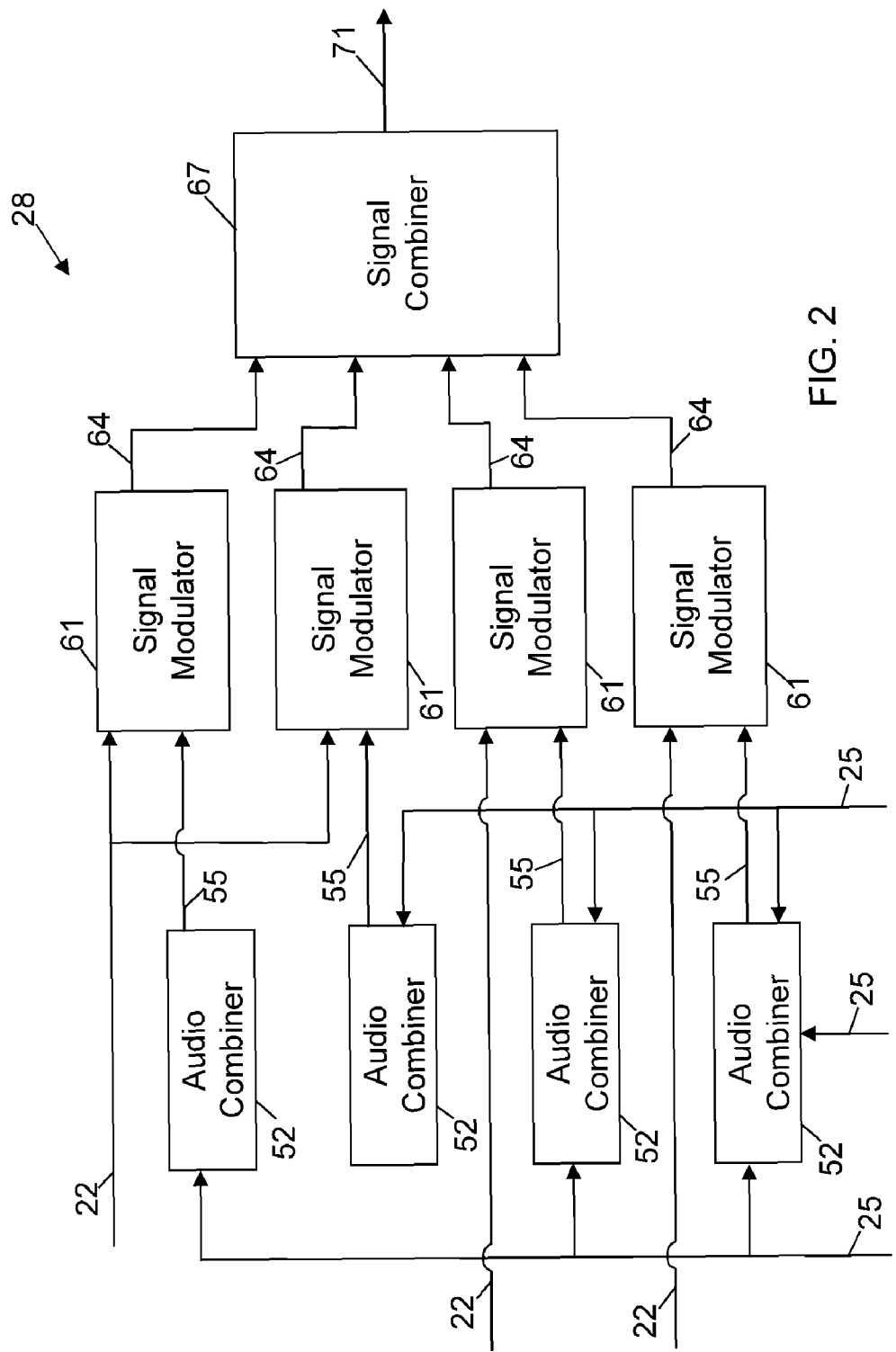
FIG. 2 is a block diagram illustrating a detailed view of an interface device depicted in FIG. 1.

FIG. 2 depicts a more detailed view of the interface device 28. The interface device 28 includes audio combiners 52 configured to receive audio signals 25 and to combine the received audio signals 25 into a single combined audio signal 55. As shown by FIG. 2, each audio combiner 52 preferably receives a different combination of audio signals 25, although it is possible for any one of the combined signals 55 to include the same combination of audio signals 25 as any other combined signal 55. Note that when an audio combiner 52 receives only one audio signal 25, the combined signal 55 output by the combiner 52 matches the one signal 25 received by the combiner 52.

As an example, one of the combined signals 55 may include an audio signal 25 defining comments between a driver and the driver's pit crew and also an audio signal 25 defining sounds (i.e., vehicular noises) received by a microphone located in the driver's vehicle. Another of the combined signals 55 may include the aforementioned audio signals 25 as well as an audio signal 25 defining a radio commentator's comments. Another combined signal 55 may only include an audio signal 25 defining a television commentator's comments. Accordingly, the combined signals 55 preferably define different combinations of sounds. It should be noted that combinations of audio signals 25 other than those described hereinabove are possible.

As shown by FIG. 2, each combined signal 55 is transmitted to a respective signal modulator 61. Each signal modulator 61 is also configured to receive a respective one of the video signals 22 received by the interface device 28. Each signal modulator 61 is configured to combine the received combined signal 55 and video signal 22 and to modulate the received signals 55 and 25 on a unique frequency range. The signal modulator 61 is then designed to transmit the modulated signal 64, which comprises the combined signal 55 and the video signal 22 received by the signal modulator 61, to a combiner 67. The combiner 67 is configured to combine each of the modulated signals 64 transmitted from each of the signal modulators 61 into a single combined (i.e., multiplexed) signal 71. This combined signal 71 is then transmitted to a plurality of receivers 75.

Various techniques exist for transmitting combined signal 71 to receivers 75. For example, a coaxial cable may be used to transmit the combined signal 71 to each of the receivers 75. In another example, the system 20 may include a wireless transmitter (not shown) that transmits the combined signal 71 to the receivers 75. Any technique for transmitting the combined signal 71 to the receivers 75 should be suitable for implementing the present invention.

Figure 3:
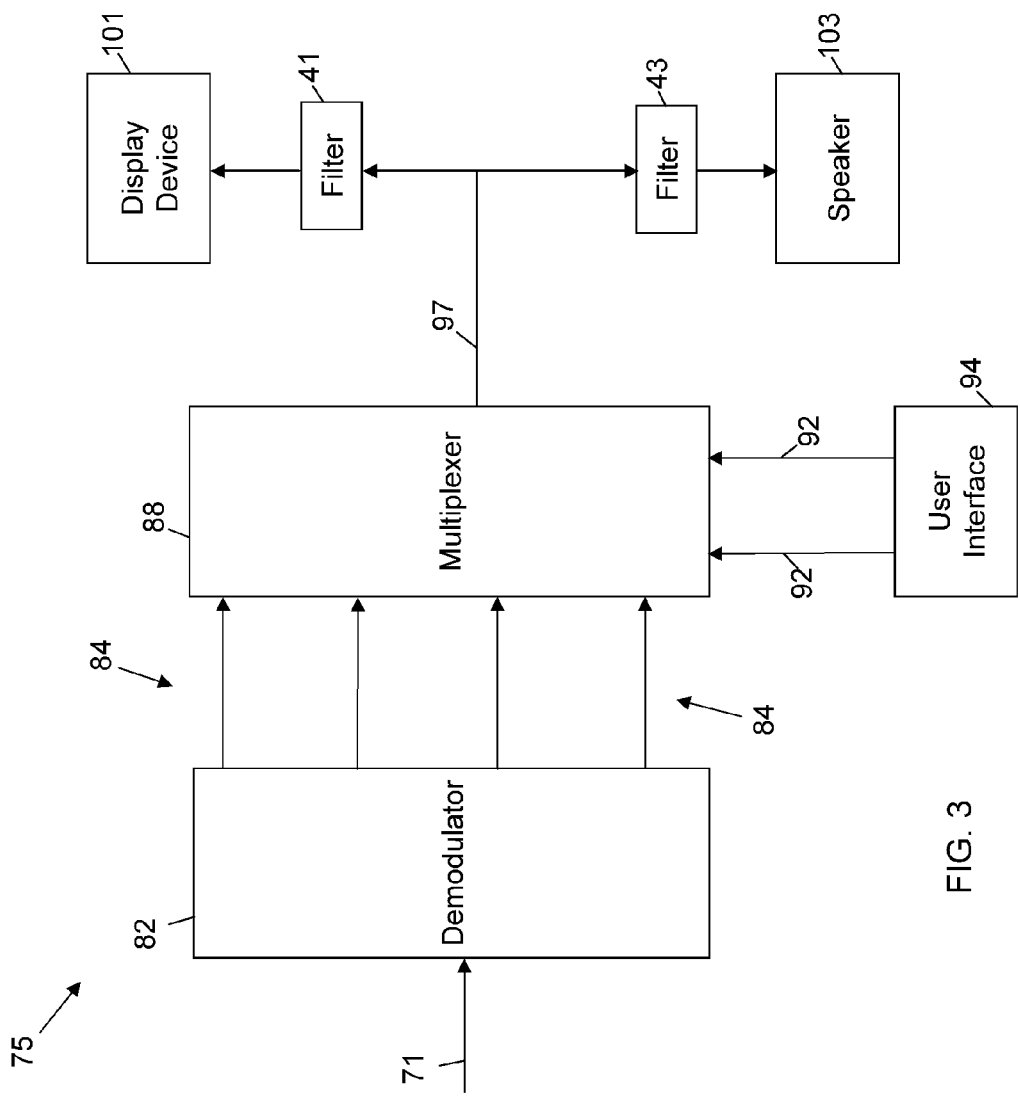
FIG. 3 is a block diagram illustrating a detailed view of a receiver depicted in FIG. 1.

A more detailed view of receiver 75 is shown by FIG. 3. Receiver 75 preferably includes a demodulator 82. The demodulator 82 is configured to demodulate the combined signal 71 and to separate (i.e., demultiplex) the combined signal 71 into signals 84 based on frequency, such that each signal 84 respectively corresponds with one of the modulated signals 64. In other words, the demodulator 82 recovers the individual signals 64 as signals 84, and each signal 84 is, therefore, defined by the same video and audio signals 22 and 25 that define its corresponding modulated signal 64. Therefore, like modulated signals 64, each signal 84 is preferably comprised of a unique combination of video and audio signals 22 and 25.

Signals 84 are transmitted from demodulator 82 to a multiplexer 88, which also receives control signals 92 from a user interface 94. The user interface 94 preferably includes buttons or other types of switches that enable a spectator to select one of the signals 84 via control signals 92. In this regard, the multiplexer 88, through techniques well known in the art, selects one of the signals 84 based on control signals 92 and outputs the selected signal 84 as output signal 97, as shown by FIG. 3.

The receiver 75 includes an audio signal filter 41 configured to filter the audio signal(s) 25 out of signal 97. Therefore, only the video signal(s) 22 within signal 97 are transmitted to a display device 101, which is configured to render the received video signal(s) 22 (i.e., display an image defined by the received video signal(s) 22) to the spectator.

The receiver 75 also includes a video signal filter 43 configured to filter the video signal(s) 22 out of signal 97. Therefore, only the audio signal(s) 25 within signal 97 are transmitted to a speaker 103, which is configured to produce sounds defined by the received audio signal(s) 25, through techniques well known in the art.

In an embodiment, the display device 101 and speaker 103 may be included within a head mounted display (HMD), which is discussed in further detail hereinbelow. By utilizing head mounted displays, the spectator's experience may be enhanced. For example, when a head mounted display is used to show an in-car view from a camera located in a driver's car during an auto race, the spectator sees a similar view as the driver of the car. Because the head mounted display limits the spectator's peripheral view of the environment around him, the user naturally focuses on the view provided by the head mounted display. Therefore, the user may feel almost as if he were riding in the car along with the driver, thereby enhancing the spectator's experience. The head mounted display may similarly enhance a spectator's experience at other events, such as other sporting events, for example.

Furthermore, when the combined signal 71 is transmitted via a coaxial cable, the receiver 75 may be located at a spectator's stadium seat or other convenient location. When the combined signal 71 is transmitted via a wireless transmitter, the receiver 75 is portable, and a spectator may carry the receiver 75 with him and choose where he would like to view the images and hear the sounds produced by the receiver 75.

Accordingly, the spectator may remain in his seat (or other convenient location) and control, by manipulating buttons or other types of switches in the user interface 94, which combination of video and audio signals 22 and 25 are respectively transmitted to display device 101 and speaker 103. Therefore, the system 20 gives the spectator more flexibility in how the spectator views the race and, as a result, makes the race a more enjoyable experience.

It should be noted that video signals 22 and audio signals 25 may be separately transmitted to receiver 75. For example, video signals 22 may be processed and transmitted to receiver 75 via interface device 28 or other type of device, and audio signals 25 may be transmitted to receiver 75 via another device. Through conventional techniques, the receiver 75 may then be configured to select the audio and video signals 25 and 22 to be transmitted to display device 101 and speaker 103.

Head Mounted Displays

Figure 4:
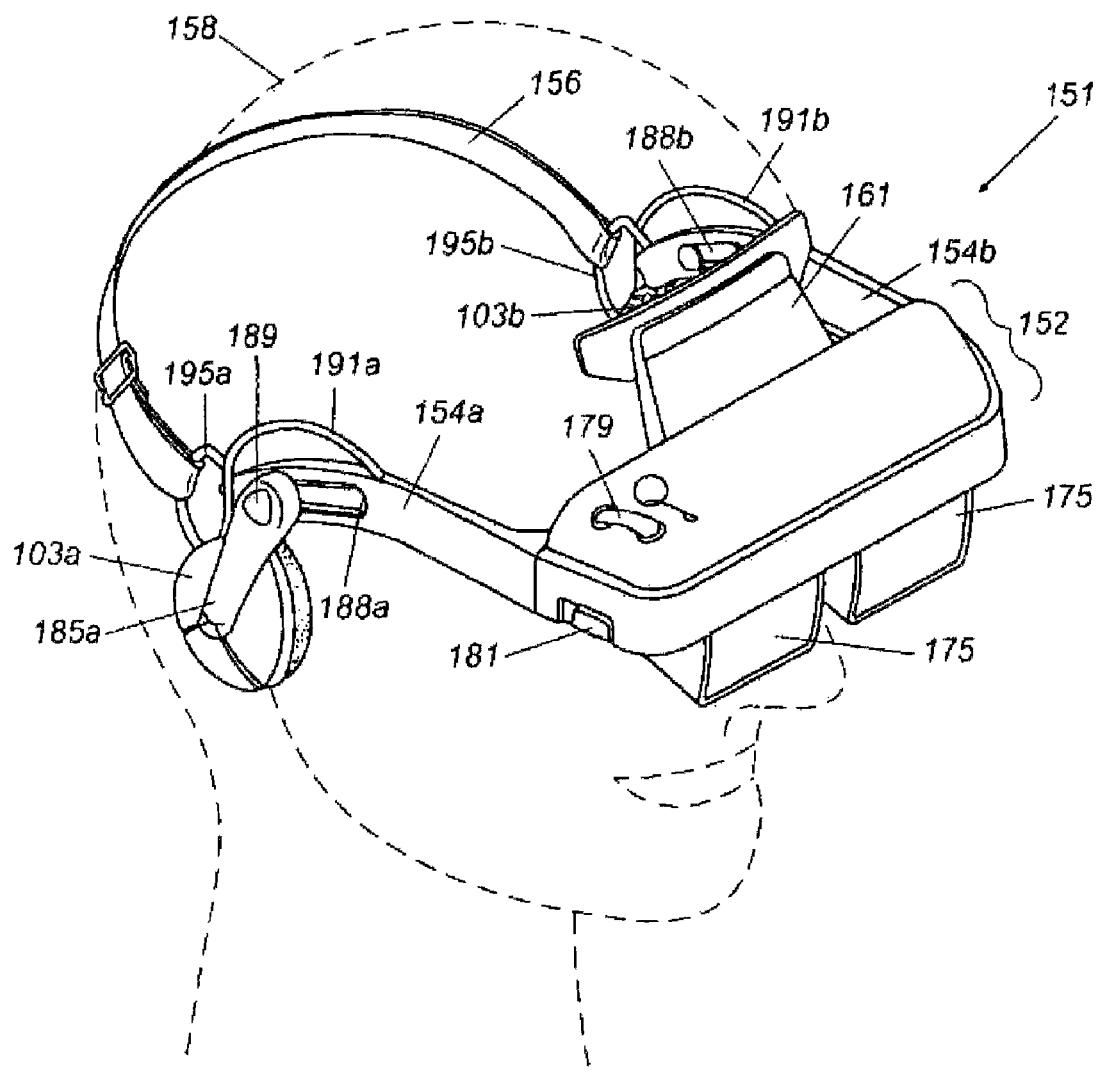
FIG. 4 is a three dimensional view of a conventional head mounted display.
Figure 5:
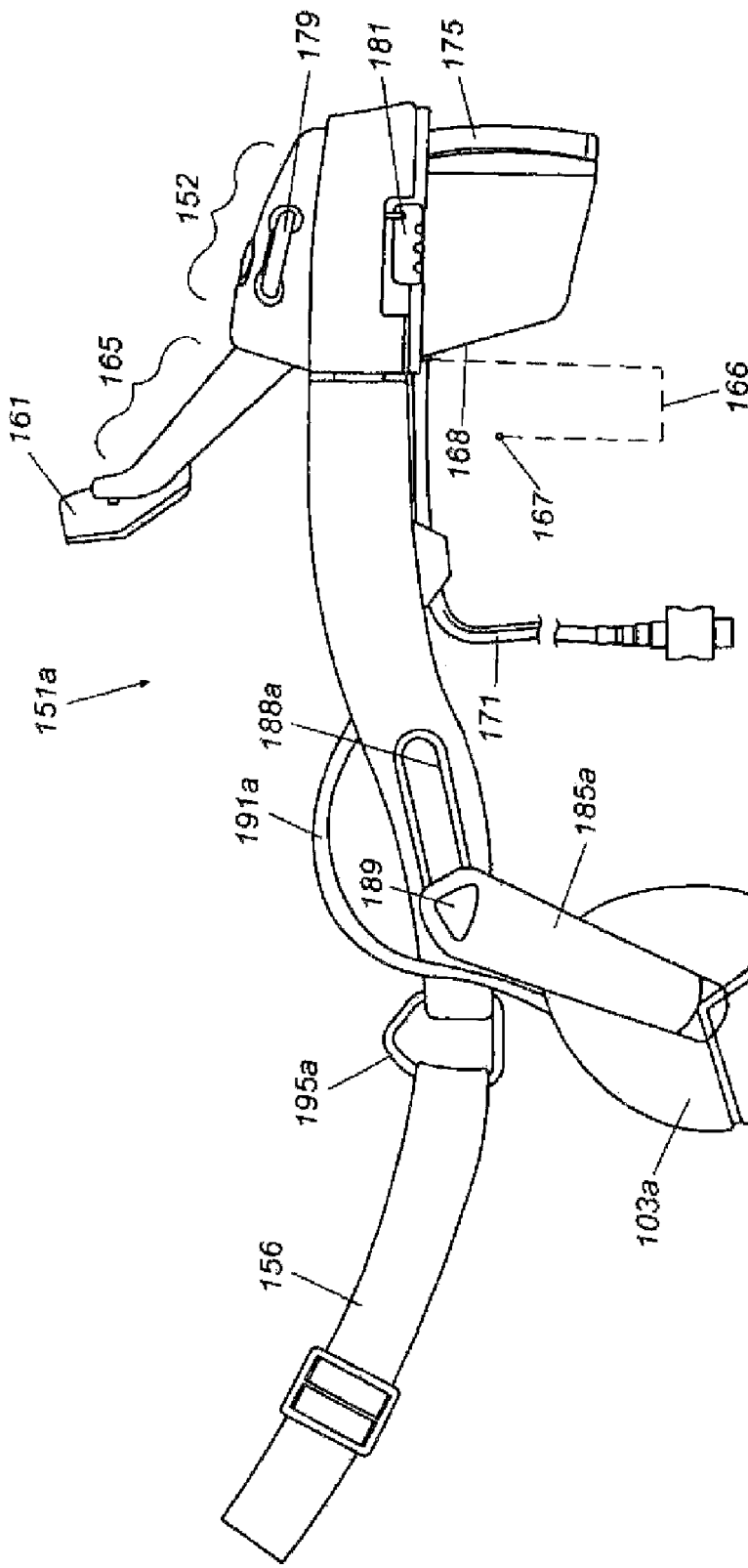
FIG. 5 is a side view illustrating the conventional head mounted display depicted in FIG. 4.

Many different types of head mounted displays may be employed to implement the present invention. Examples of head mounted displays that may be used to implement the present invention are fully described in U.S. Pat. No. 5,844,656, entitled "Head Mounted Display with Adjustment Components" and filed on Nov. 7, 1996, by Ronzani et all, and U.S. Pat. No. 5,903,395, entitled 'Personal Visual Display System," and filed on Aug. 31, 1994, by Rallison et al., which are both incorporated herein by reference. FIGS. 4 and 5 depict a head mounted display (HMD) 151 described by U.S. Pat. No. 5,903,395.

As depicted in FIG. 4, the HMD 151 includes a main portion 152, containing electronics or optics used to provide a visual display to the spectator. The HMD 151 also includes left and right temple pieces 154a and 154b that may be used for assisting and holding the main portion 152 in the desired position to deliver video output to the spectator's eyes. A strap 156 can be provided to further assist in holding the apparatus in the desired position with respect to the head 158 of the spectator. A forehead brace 161 can be provided to further assist in proper positioning of the main portion 152. The forehead brace 161 is useful to transfer some of the weight of the apparatus to the spectator's forehead. This may provide a more comfortable configuration than having substantially all of the weight transferred via other components such as the temple pieces 154a and 154b, headstrap 156 and/or a nose bridge piece (not shown) that may be used in other types of HMDs.

As can be seen in FIG. 5, the forehead brace 161 extends back a distance 165 from the main portion 152 of the apparatus. As a result, there is an amount of space 166 between the eye position 167 of the spectator and the portion 168 of the apparatus which resides in front of the spectator's eyes sufficient to accommodate the spectator's eyeglasses, e.g., about one inch or more (in one embodiment, about 25 mm).

A connection is provided for establishing communication or data transfer to the HMD 151, which, in the depicted embodiment, involves a cable 171 mounted along the underside of the left temple piece 154a. As an example, the demodulator 82 (FIG. 3), multiplexer 88, and user interface 94 may be included in a device separate from the HMD 151 shown by FIGS. 4 and 5. The cable 171 may transmit the signals 97 (FIG. 3) to the filters 41 and 43, which are located in the main portion 152. The filtered signals from filters 41 and 43 may be respectively transmitted to display device 101 (FIG. 3) and speaker 103 (FIG. 3) via other cables or other types of connections.

As can be seen by FIGS. 4 and 5, speakers 103a and 103b are respectively provided for each ear of the spectator. Furthermore, the display device 101 (FIG. 3) is comprised of two liquid crystal displays (LCDs) 175 that receive video signals and produce images based on the received video signals through techniques well known in the art. Each of the LCDs 175 is positioned in front of a respective eye of the spectator so that each eye of the spectator views an image produced by one of the LCDs 175, In the depicted embodiment, a rocker switch 179 can be used to provide control of a parameter which varies through a range, such as the volume of the sound produced by the speakers 103a and 103b. Other items that could be controlled in this fashion include, but are not limited to, tint, hue or contrast of the video, selection of a video and/or audio source such as channel selection, image brightness, audio tone (i.e., treble/bass control) and the like. A slider switch 181 can be used, e.g., to select among discrete choices. For example, the slider switch 181 may be used to select left, right or no relative frame phasing, to select between stereo and non-stereoscopic views, etc. Other controls and/or indicators can also be used and can be mounted on various surfaces of the head-mounted apparatus of FIG. 4.

Left speaker 103a is movably attached to the end of the temple piece 154a, e.g., by pivotal arm 185a which can be laterally adjusted to a mounting slot 188a in temple piece 154a. The speaker 103a can be held in position by friction or a detent tightener 189 can be used to secure the speaker 103a in the desired position. Right speaker 103b is similarly secured to temple piece 154b. Cables 191a and 191b are respectively used in the HMD 151 of FIG. 4 to provide the desired signals to the speakers 103a and 103b, respectively. The head strap 156 is preferably coupled to the temple pieces 154a and 154b via left and right strap pivots, loops or D-rings 195a and 195b. A length and/or tightness adjustment mechanism such as a buckle, for example, can be provided on the strap 156.

Figure 6:
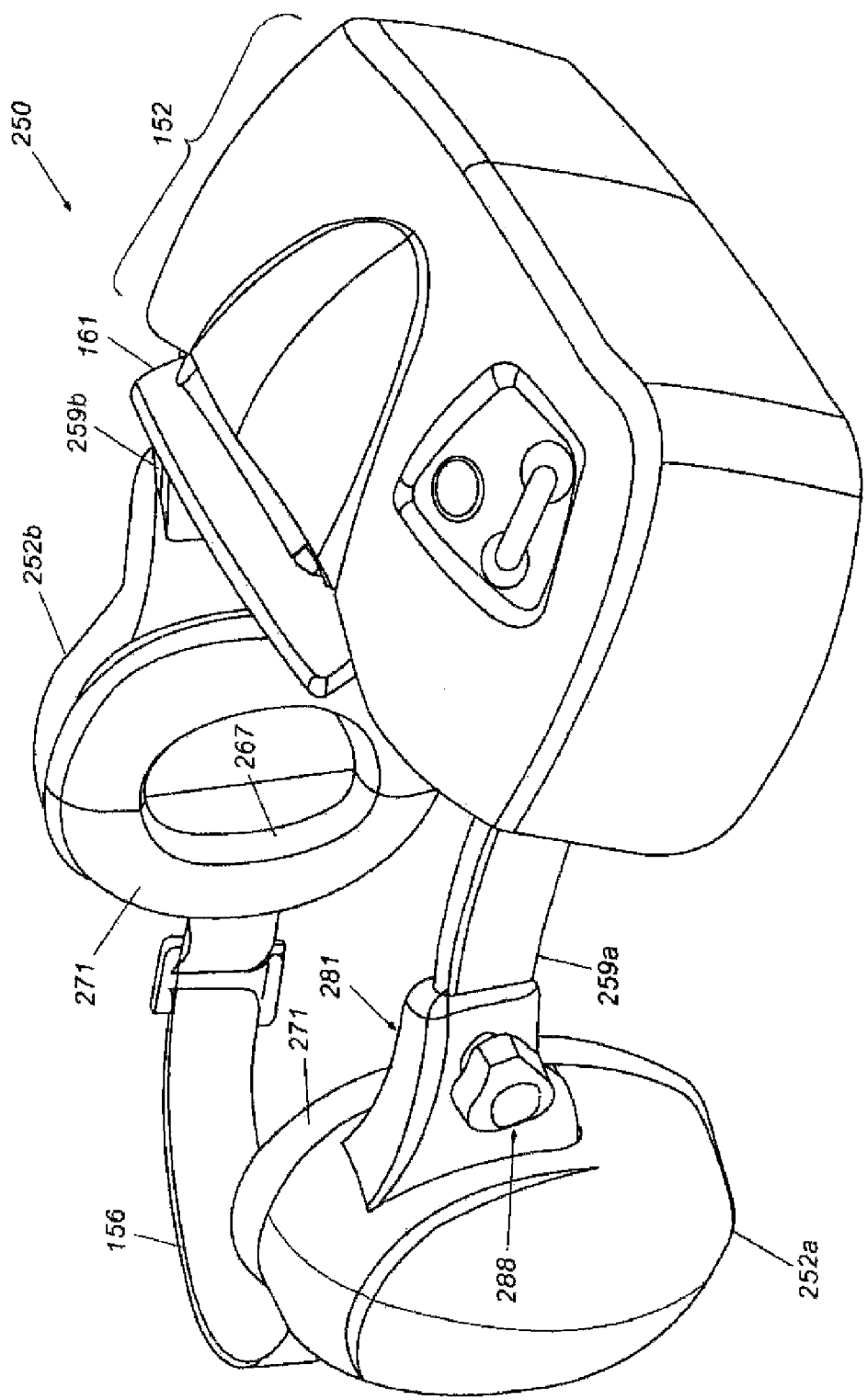
FIG. 6 is a three dimensional view of a head mounted display in accordance with an embodiment of the present invention.

At many sporting events (e.g., auto races, in particular), relatively loud noises are produced. Therefore, it would be difficult for a user to hear the selected audio signals via many conventional head mounted displays, such as the one depicted by FIGS. 4 and 5. Accordingly, the inventors have designed a HMD 250 that includes noise reduction devices 252a and 252b to reduce the amount of external noise heard by a spectator, as shown by FIG. 6.

Similar to HMD 151 of FIG. 4, HMD 250 includes temple pieces 259a and 259b that are connected to main portion 152. Main portion 152 and temple pieces 259a and 259b form a head mount to which other components of the HMD 151 can be coupled. Each noise reduction device 252a and 252b is similarly designed and is respectively coupled to the temple pieces 259a and 259b such that each device 252a and 252b fits over a respective ear of a spectator during use. In this regard, each noise reduction device 252a and 252b forms a cup-shaped shell having a recess 267 (FIGS. 7A-7D). Preferably, a padded cushion 271, such as the one described in U.S. Pat. No. 4,856,118 entitled "Headphone Cushioning," which is incorporated herein by reference, is positioned at the mouth of each device 252a and 252b as shown by FIGS. 7A-7D so that the noise reduction devices 252a and 252b comfortably engage the spectator's head during use. When device 252a or 252b is engaged with the spectator's head, the spectator's ear fits into the recess 267, and the engaged device 252a or 252b blocks external noises from reaching the ear. Therefore, devices 252a and 252b are similar to the ear cup described in U.S. Pat. No. 5,023,955, entitled "Impact-Absorbing Sound -Attenuating Ear cup," filed on Apr. 13, 1989, by Murphy, II et al., which is incorporated herein by reference.

Similar to U.S. Pat. No. 5,018,599, entitled "Headphone Device," and filed on Sep. 18, 1989, by Masahiro et al., which is incorporated herein by reference, each noise reduction device 252a and 252b is respectively coupled to and houses speakers 103a and 103b, The speakers 103a and 103b are respectively coupled to cables 191a and 191b, and produce sound corresponding to the audio signals transmitted via cables 191a and 191b. Consequently, in use, external noises are attenuated, yet the spectator can clearly hear the selected audio signals produced by the speakers 103a and 103b.

Device 252a will be described in more detail hereafter. However, it should be apparent to one skilled in the art that device 252b includes the same features of device 252a except that device 252b is coupled to temple piece 259b (instead of piece 259a) and is designed to cover the spectator's opposite ear.

Figure 7A:
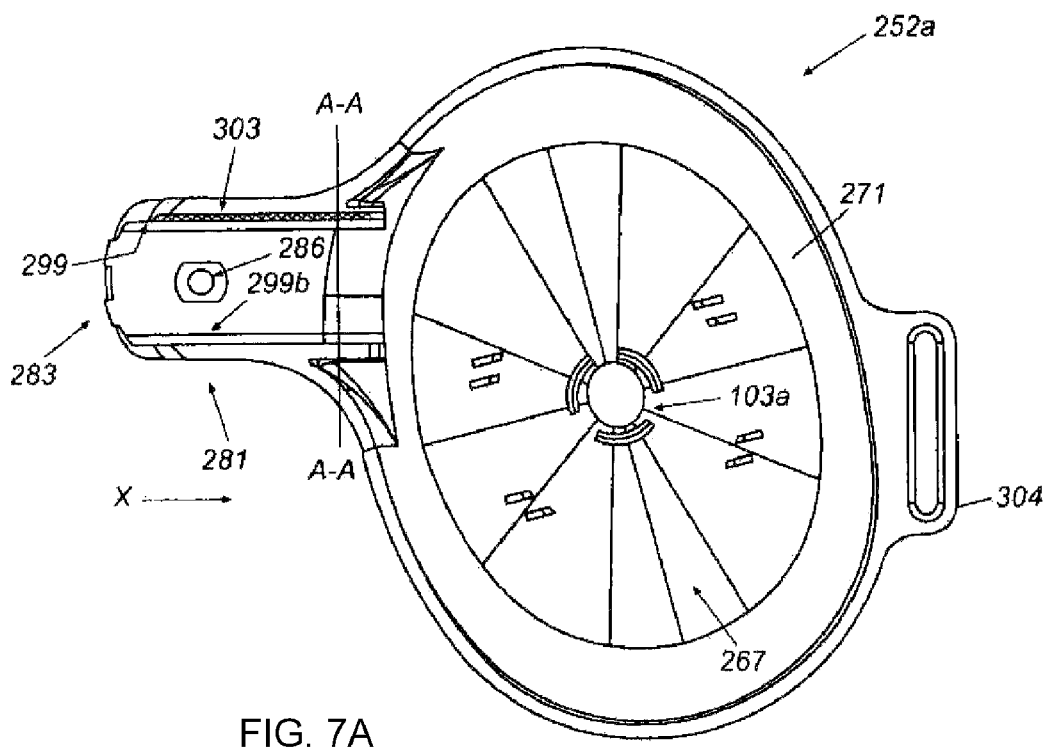
FIG. 7A is a side view of the noise reduction device of the head mounted display depicted in FIG. 6.
Figure 7B:
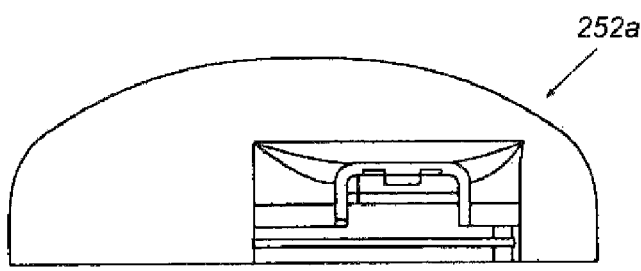
FIG. 7B is a front view of the noise reduction device of the head mounted display depicted in FIG. 6.
Figure 7C:
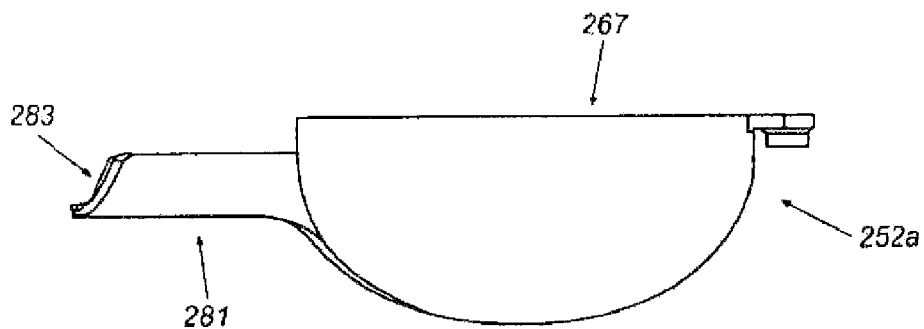
FIG. 7C is a bottom view of the noise reduction device of the head mounted display depicted in FIG. 6.
Figure 8A:
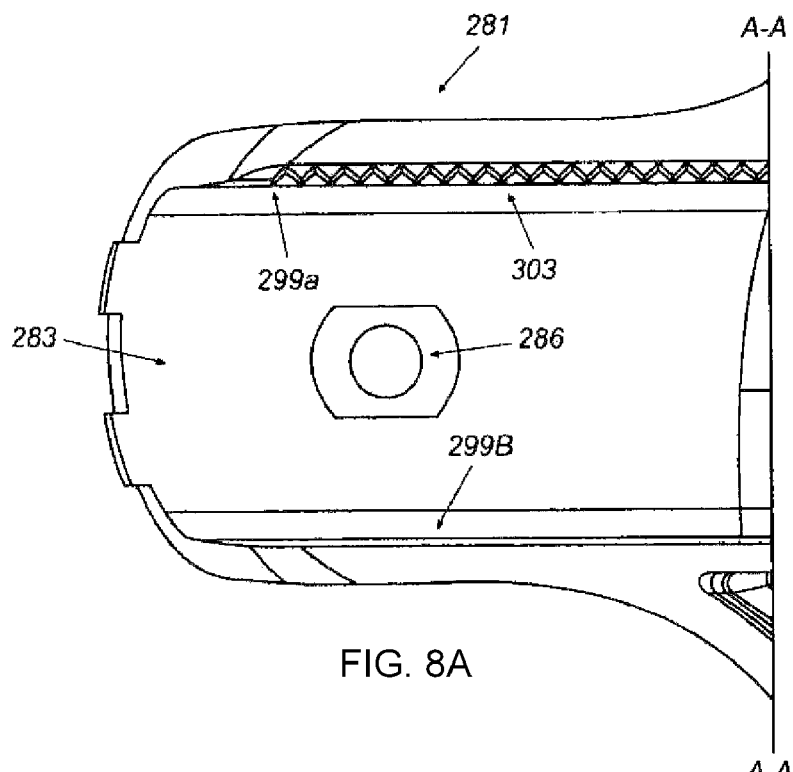
FIG. 8A-B is a more detailed view of the left temple piece of the head mounted display depicted in FIG. 6.
Figure 8B:
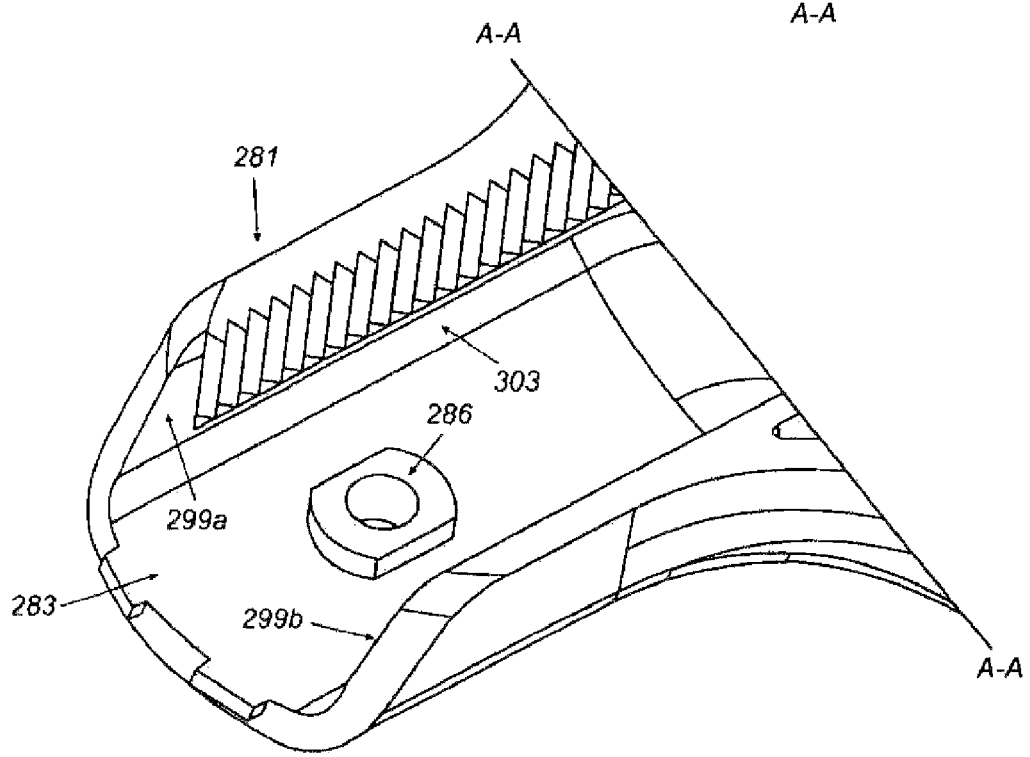

Referring to FIGS. 7A, 8A, and 8B, the device 252a preferably includes a member 281 having a slot 283 adapted to receive temple piece 259a. The member 281 also includes a hole 286. In operation, the temple piece 259a passes through slot 283, and a securing member 288 (FIG. 9), such as a bolt or a screw for example, passes through the hole 286 and passes through a slot 264 (FIG. 9) in the temple piece 259a. The securing member 288 is preferably secured to the temple piece 259a and the member 281 via any suitable technique. For example, the securing member 288 may be screwed through the member 281 via hole 286, and the securing member 288 may also be screwed through a piece 291 (FIG. 9) located on a side of the temple piece 259a opposite of the member 281. Therefore, the member 281 is secured to the temple piece 259a via the securing member 288. However, it should be apparent to one skilled in the art that other devices and methodologies may be employed to secure the member 281 to temple piece 259a.

Figure 9:
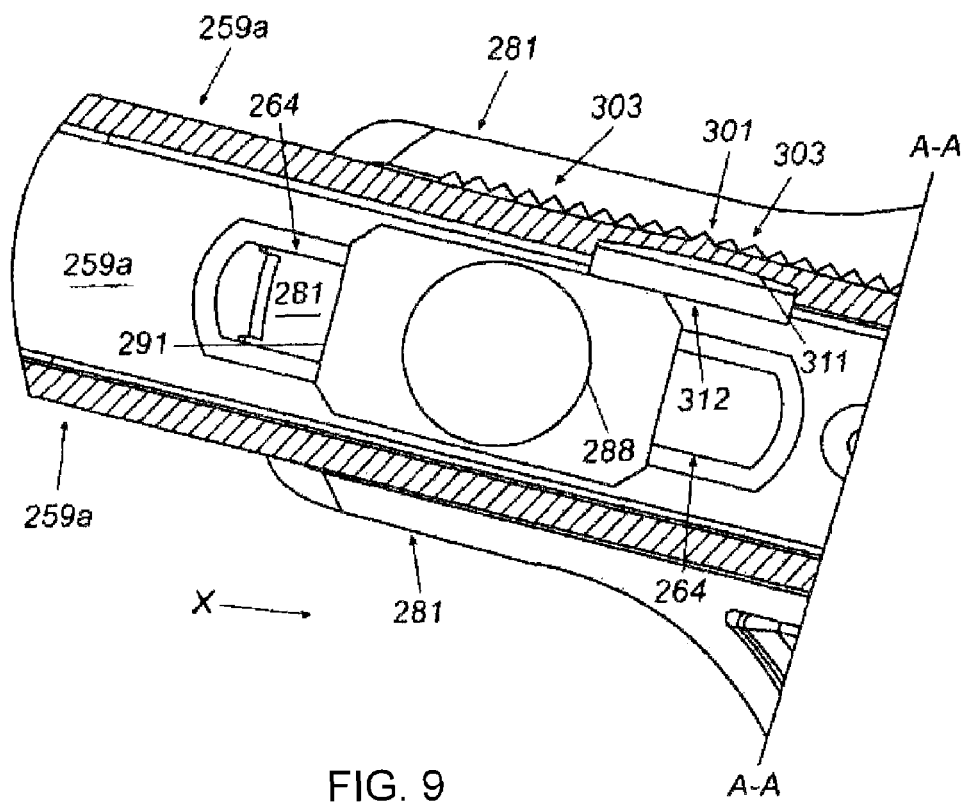
FIG. 9 is a top view of a temple piece of the head mounted display depicted in FIG. 6.
Figure 10:
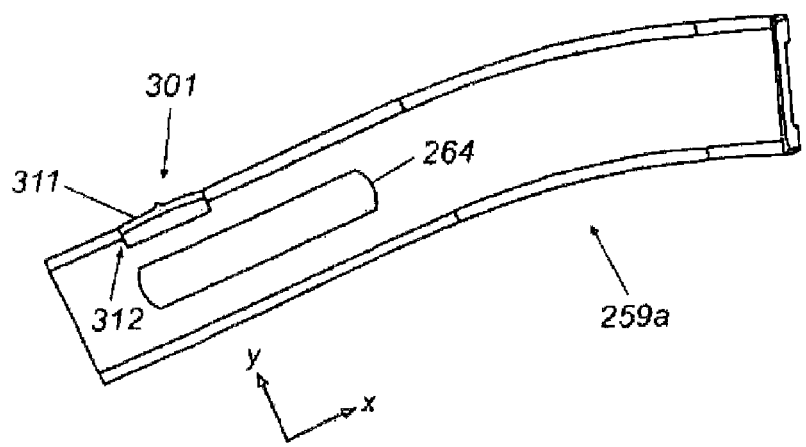
FIG. 10 is a side view of a temple piece of the head mounted display depicted in FIG. 6.

As shown by FIG. 10, a ridge 301 is formed on a side of the temple piece 259a that engages a wall 299 (FIG. 7A) of slot 283, when the temple piece 259a is received by slot 283. As shown by FIG. 7A, a portion of the wall 299 of slot 283 includes a series of notches 303 that are each capable of receiving the ridge 301. When the ridge 301 is received by a notch 303, as shown by FIG. 9, any force tending to move the device 252a relative to the temple piece 259a in the x-direction causes the ridge 301 to press against a portion of the wall 299 forming the notch 303, until the device 252a is pushed with a force sufficient to deform a flexible portion 311 of temple piece 259a. The flexible portion 311 is positioned adjacent to slot 312 to allow the flexible portion 311 to deform away from the wall 299. Once this occurs, the ridge 301 moves past the notch 303 more easily, allowing the temple piece 259a to move relative to member 281 and, therefore, device 252a. The flexible portion 311 preferably has sufficient elasticity to return to its undeformed state once the ridge 301 moves past the notch 303. Therefore, after moving past the aforementioned notch 303, the ridge 301 should engage a portion of the wall 299 forming another notch 303.

Therefore, the user can slide the device 252a in the x-direction along the length of the temple piece 259a causing the ridge 301 to be received by different notches 303 until the device 252a is properly positioned relative to the spectator's head (i.e., until the spectator's ear is comfortably positioned within the recess 267 of the device 252a). Once the spectator stops sliding the device 252a and the ridge 301 is received by one of the notches 303, the position of the device 252a relative to the temple piece 259a and, therefore, the spectator's head should remain constant until a force sufficient for deforming the flexible portion is exerted on the HMD 250.

As shown by FIG. 6, the device 252a is preferably fastened to an end of the strap 156. Therefore, each end of the strap 156 is coupled to each of the noise reduction devices 252a and 252b. To fasten the devices 252a and 252b to the strap 156, each device 252a and 252b may include a clip, clasp, loop, ring 304 (shown in FIG. 7A) or other type of fastening device. The length of the strap 156 can be adjusted via conventional techniques to adjust the size of the MID 250. Therefore, to don the MID 250, a user places the forehead brace 161 (FIG. 6) against his forehead and positions the strap 156 around the back of his head. The spectator then tightens the strap 156 (i.e., reduces the length of the strap 156) until the HMD 250 is comfortably held in place. The spectator adjusts the position of the devices 252a and 252b by respectively sliding the devices 252a and 252b along the length of the temple piece 259a and 259b in the x-direction until the devices 252a and 252b are properly positioned. Then, the spectator can further tighten the strap 156 as desired to further press the forehead brace 161 and the devices 252a and 252b against the spectator's head.

In this regard, tightening the strap 156 reduces the circumference of the HMD 250 thereby pressing each device 252a and 252b and the forehead brace 161 further against the spectator's head. To a certain degree, as the strap 156 is tightened, external noise is better attenuated, and it is less likely that the HMD 250 will move with respect to the spectator's head. Accordingly, the spectator can tighten or loosen the strap 156 as desired until the desired fit and desired noise reduction is achieved.

It should be noted that it is possible to swap the position of ridge 301 with notches 303. In other words, it is possible to form ridge 301 on a flexible portion of device 252a and to form the notches 303 in the temple piece 259a without materially affecting the performance or operation of the HMD 250.

Figure 11:
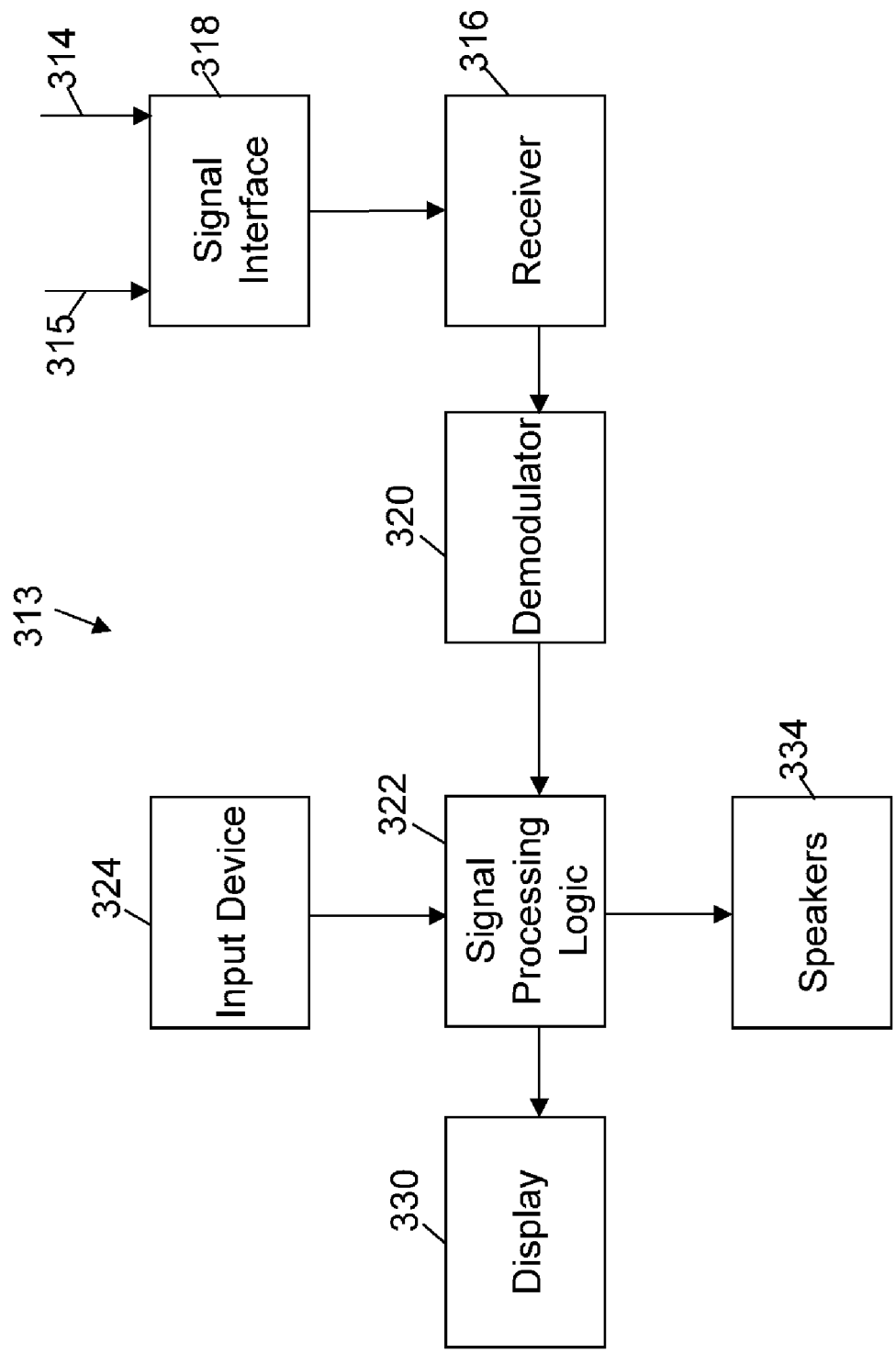
FIG. 11 is a block diagram illustrating a video/audio receiving system in accordance with an embodiment of the present invention.

FIG. 11 depicts a video/audio receiving system 313 implementing the principles of the present invention. At least one video signal 314 and at least one audio signal 315 are received by a receiver 316. Each of the video signals 314 defines a view of the event from a different perspective. For example, the video signals 314 may be generated by different video cameras located at different locations around the stadium. Furthermore, each of the audio signals 315 defines different sounds associated with the game. For example, at least one of the audio signals 315 may be generated from a microphone located close to the sideline of the game or in one of the helmets of one of the players of the game such that the audio signal defines sounds from the participants in the game. Alternatively, at least one of the audio signals 315 may define the comments of television commentators, and at least one of the audio signals 315 may define the comments of radio commentators.

In particular, at least one of the audio and one of the video signals may be transmitted as a single combined signal from an audio/video system described in U.S. patent application Ser. No. 09/322,411 entitled "Video/Audio System and Method Enabling a User to Select Different Views and Sounds Associated with an Event." Additionally, one or more of the video and/or audio signals may be wireless, in which case, the interface 318 may comprise an antenna for receiving the wireless signals. However, various other types of signal interfaces 318 are possible. For example, the signal interface 318 may be a cable or other type of signal transmission apparatus. Any type of wireless and/or non-wireless technique may be used to transmit signals to the video and audio receiver 316 via the signal interface 318.

Some of the audio and video signals 315 and 314 can be unmodulated when transmitted to the receiver 316 through the signal interface 318 and, therefore, do not need to be demodulated by the system 313. However, some of the audio signals 315 and/or video signals 314 may be modulated when received by the receiver 316 and, therefore, may need to be demodulated by the system 313. For example, at least one of the audio signals 315 defining the comments of the radio commentators may be modulated as a radio signal for transmission to radios located at or away from the stadium, and at least one of the video signals 314 may be modulated as a television signal for transmission to televisions located at or away from the stadium. Therefore, as shown by FIG. 11, the system 313 preferably includes a demodulator 320 configured to demodulate any modulated audio signals 315 and/or video signals 314 received by the receiver 316 through the signal interface 318.

Once demodulated, if necessary, the audio and video signals 315 and 314 are processed by signal processing logic 322, which selects and conditions the signals 315 and 314. More specifically, the signal processing logic 322 selects, based on inputs from the user, one of the audio signals 315 and one of the video signals 314. Note that the logic 322 may be implemented via hardware, software, or a combination thereof. Further, the logic 322 may include one or more filters for filtering out the unselected signals 315 and 314. After selecting one of the audio and video signals 315 and 314, the logic 322 conditions the selected video signals 314 so that they are compatible with the virtual image display system 330, and the logic 322 conditions the selected audio signals 315 so that they are compatible with the speakers 334. The logic 322 then transmits the conditioned audio signals 315 to the speakers 334, which converts the conditioned audio signals 315 into sound. The logic 322 also transmits the conditioned video signals 314 to the virtual image display system 330, which displays the image defined by the conditioned video signals 314 according to techniques known in the art. Note that the processing performed by the signal processing logic 322 may be similar to or identical to the processing performed by the system in U.S. patent application Ser. No. 09/322,411 entitled "Video/Audio System and Method Enabling a User to Select Different Views and Sounds Associated with an Event."

An input device 324, which may comprise one or more buttons knobs, dials, or other types of switches, may be used to provide the inputs for the processing performed by the processing logic 322. By controlling the components of the input device 324, the user may control various aspects of the processing performed by the logic 322, including which video signals 314 are selected for viewing, as well as which audio signals 315 are heard and the volume of the audio signals 315.

Figure 12:
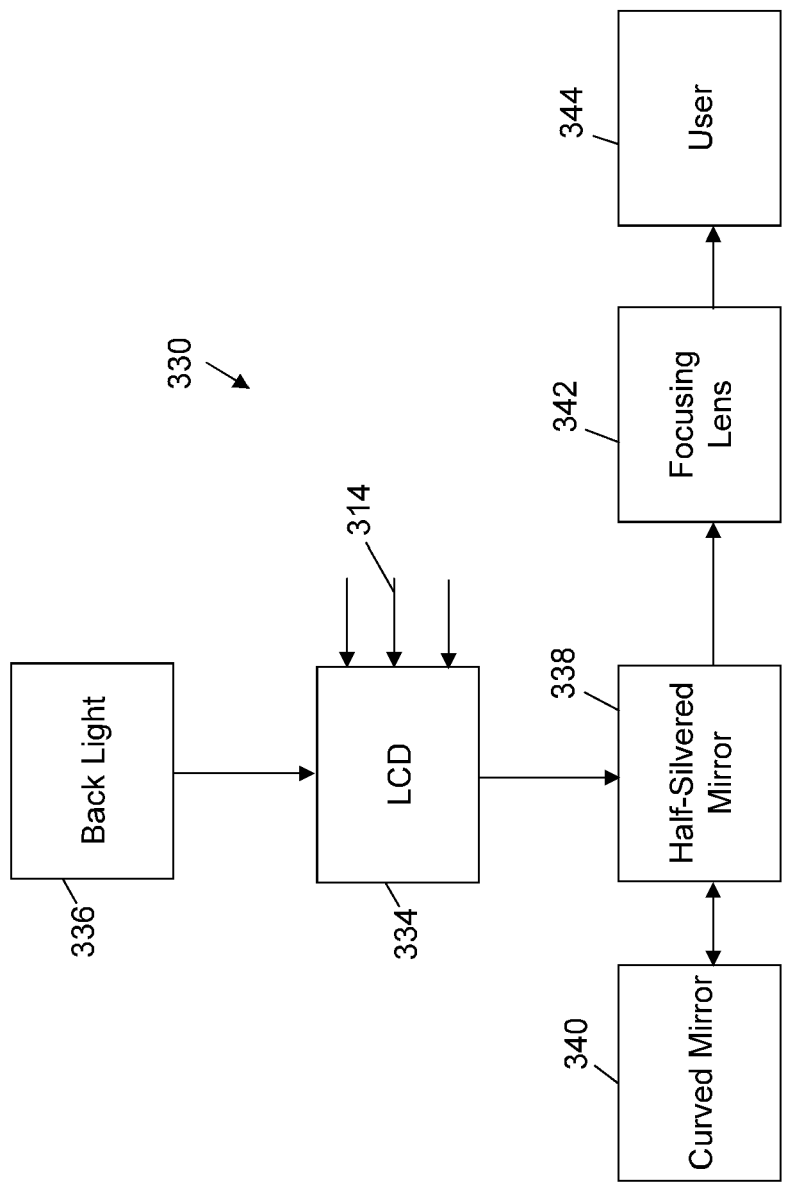
FIG. 12 is a block diagram illustrating more detailed view of a virtual image display system depicted in FIG. 11.

FIG. 12 depicts an exemplary virtual image display system 330 that may be employed to implement the principles of the present invention. A processed video signal 314 is displayed onto a Liquid Crystal Display 334. The Liquid Crystal Display 334 may be lit from the back via a back light 336, with the light shining through the Liquid Crystal Display 334, creating an image on the other side of the Liquid Crystal Display 334. On the opposite side of the Liquid Crystal Display 334 from the back light 336, some distance from the Liquid Crystal Display 334, is a half-silvered mirror 338. The half-silvered mirror 338 is set at an approximately forty-five degree angle from the Liquid Crystal Display 334. The image reflects off the half-silvered mirror 338 onto a separate curved mirror 340 set some distance away from the half-silvered mirror 338. The curved mirror 340 magnifies the virtual image. The magnified virtual image reflects off the curved mirror 340, back to the half-silvered mirror 338. The magnified virtual image passes through the half-silvered mirror 338 to a lens 342 located on the opposite side of the half-silvered mirror 338 from the curved mirror 340. The magnified virtual image passes through the lens 342, which focuses the magnified virtual image. When the handheld device 350 is held to the user's face and the user 344 looks into the lens 342, the magnified virtual image is observed by the user 344. The user 344 observes the magnified virtual image as much greater in size than the actual size of the image on the Liquid Crystal Display 334, with said magnified virtual image appearing to the user 344 to be located several feet in front of the user 344. It should be noted that other embodiments of the virtual image display system 330 may be employed without departing from the principles of the present invention. For example, in some embodiments, a single prism can be used to replace mirror 338.

In the preferred embodiment, the receiver 316, signal processing logic 322, virtual image display system 330, and speakers 334 are all embodied within a handheld device 350, which is discussed in further detail herein below. Note that the handheld device 350 may be comprised of a housing unit or a casing coupled to each of the components shown in FIG. 11. One or more of the components may be housed within the casing. By utilizing a handheld device 350 for viewing video signals 314, the user's experience may be enhanced. For example, when a handheld device 350 is used to show a field view of the game from a camera located on another side of the stadium, the user 344 sees a similar view as spectators located in that portion of the stadium.

Because the handheld device 350 limits the user's peripheral view of the environment around him, the user 344 naturally focuses on the view provided by the handheld device 350. When the user 344 desires to view the game directly, the user may quickly lower the device 350 so that the user's view of the game is not obstructed by the device 350. The handheld device 350 may similarly enhance a user's experience at other events, such as other sporting events, for example.

Furthermore, since the device 350 is handheld, the device 350 is easily portable, and the user 344 may carry the handheld device 350 with him and choose where he would like to view the images produced by the handheld device 350. Indeed, the user 344 may roam the stadium with the device 350 in hand while intermittently viewing the images and hearing the sounds produced by the system 313. Furthermore, by manipulating buttons or other types of switches 356 in the user input device 324, the user 344 may control which video signals 314 are displayed and which audio signals 315 are produced by the system 313. Accordingly, the handheld device 350 gives the user 344 more flexibility in how the user 344 observes and listens to the sporting event and, as a result, makes the event a more enjoyable experience.

Figure 13:
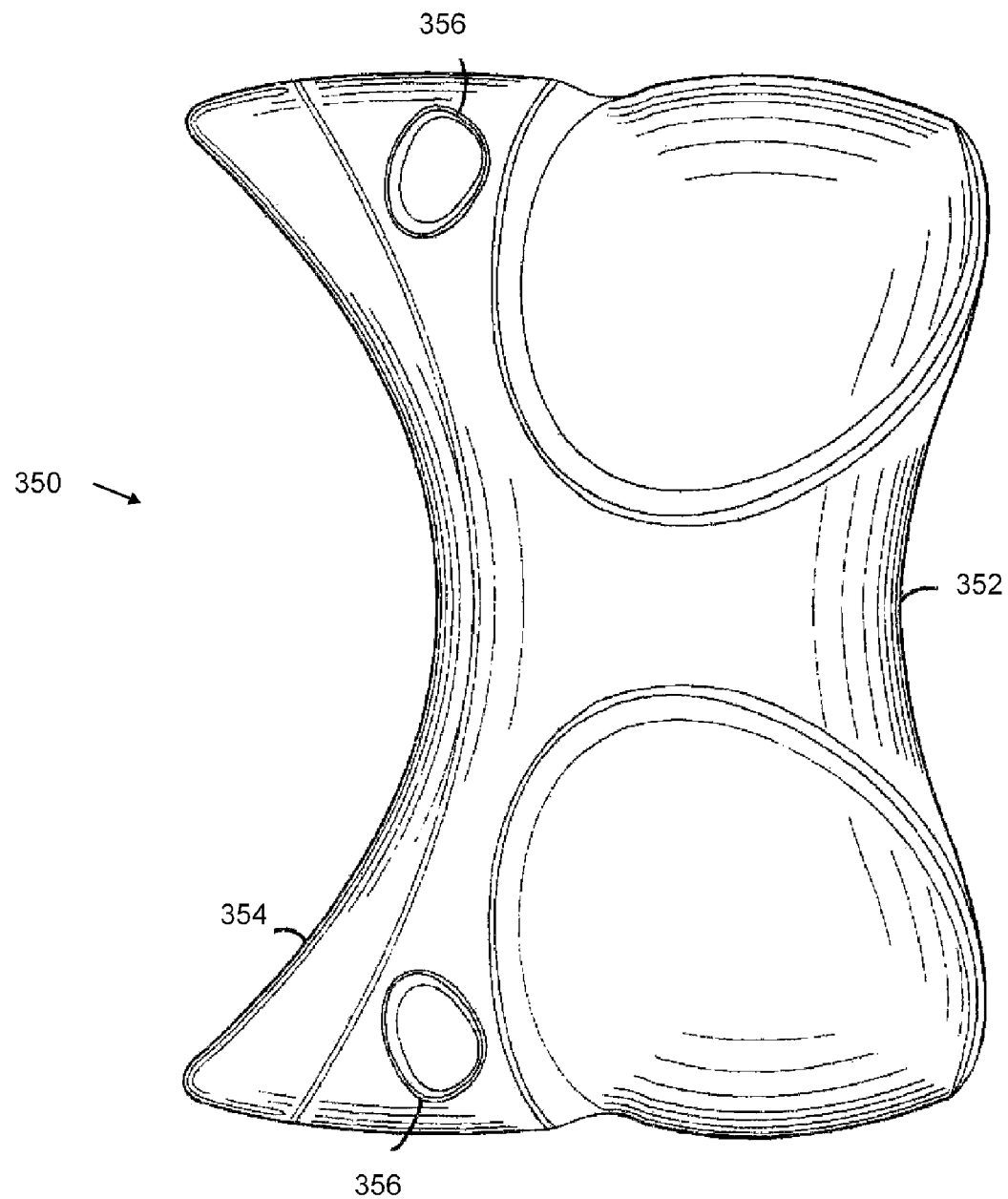
FIG. 13 is a top view of an exemplary handheld device for implementing the video/audio receiving system in FIG. 11.
Figure 14:
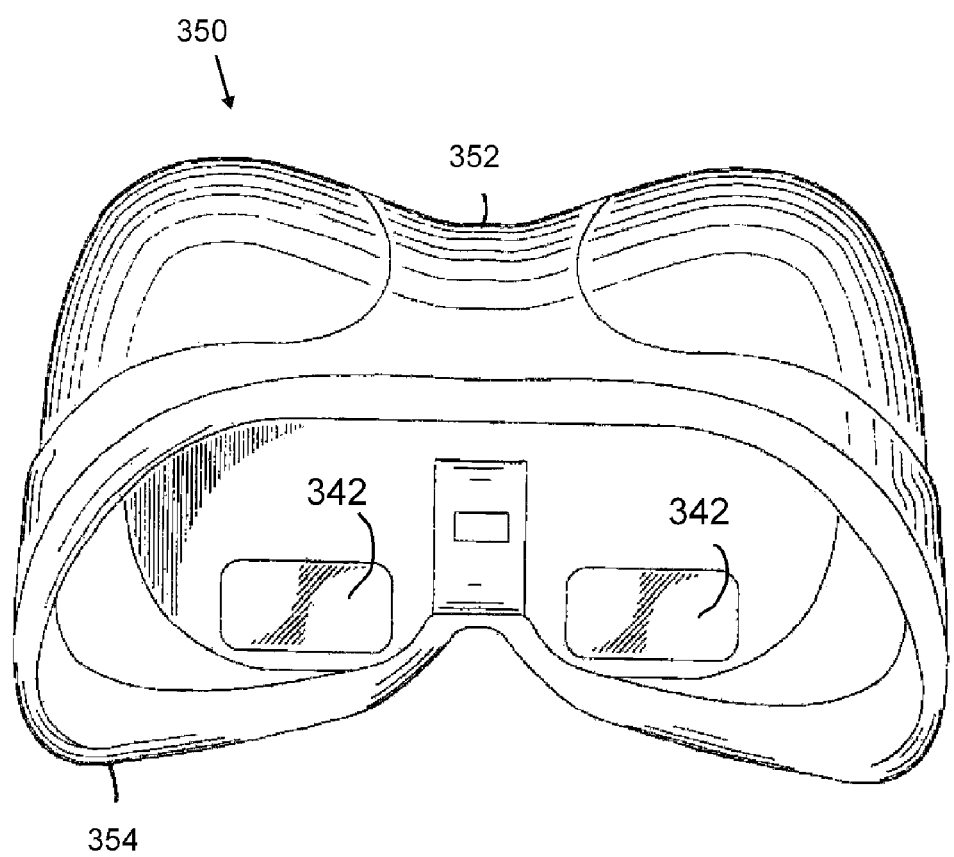
FIG. 14 is a three dimensional front view of the exemplary handheld device depicted in FIG. 13.

Many different types of casings for the handheld device 350 may be employed to implement the present invention. FIGS. 13 and 14 depict an exemplary handheld device 350.

As depicted in FIG. 13, the handheld device 350 includes a main component 352, containing the system 313 (FIG. 11) used to provide a virtual image to the user 344, as discussed hereinbefore. The handheld device 350 also includes a shroud 354 to block out ambient light. The shroud 354 is adapted to receive the user's forehead and allows the handheld device 350 to be engaged with the user's forehead while the user 344 is wearing eyeglasses or sunglasses. As can be seen in FIG. 14, the shroud 354 is shaped and sized to completely cover the user's eyes, allowing the handheld device 350 to be held against the face and/or forehead comfortably and blocking ambient light. Also as a result, there is an amount of space between the eye position of the user 344 and the lenses 342 which reside in front of the user's eyes sufficient to accommodate the user's eyeglasses, e.g., about one inch or more (in one embodiment, about 25 mm).

As depicted in FIG. 13, one or more switches 356 can be placed on the outside of the handheld device 350 for manipulation by the user 344 (not shown in FIG. 13) when the handheld device 350 is held to the user's face and/or forehead. Such switches 356 may include a rocker switch used to provide control of a parameter which varies through a range, such as channel selection. Other items that could be controlled in this fashion include, but are not limited to, tint, hue or contrast of the image, image brightness, volume control and the like. A slider switch (not shown) can be used, e.g., to select among discrete choices. For example, the slider switch (not shown) may be used to select left, right or no relative frame phasing, to select between stereo and non-stereoscopic views, etc. Other controls and/or indicators can also be used and can be mounted on various surfaces of the handheld device 350 of FIG. 13.

It should be noted that it is not necessary for the user 344 to keep the handheld device 350 within the stadium. In this regard, the audio and video signals 315 and 314 may be transmitted via satellites and/or communication networks to various locations around the world, and the user 344 may select the view he prefers the most from just about any location capable of receiving a video signal 314 and/or audio signal 315.

It should also be noted that the handheld device 350 may be retrieved from the user 344 after the user 344 is finished viewing the event so that the handheld device 350 can be provided to another spectator for another event at the stadium. Each user 344 may be charged a usage fee for the user's use of the handheld device 350. In some embodiments, payment of the fee may be required before the user 344 is provided with the device 350. In other embodiments, the device 350 may receive information, via signals 314 and/or 315 or otherwise, indicating whether the device 350 is authorized to produce sounds and images defined by the signals 314 and 315. In this embodiment, the device 350 is configured to produce such images and sounds only when authorized to do so, and such authorization should only be transmitted to the device 350 once the user 344 of the device 350 has provided payment.

Figure 15:
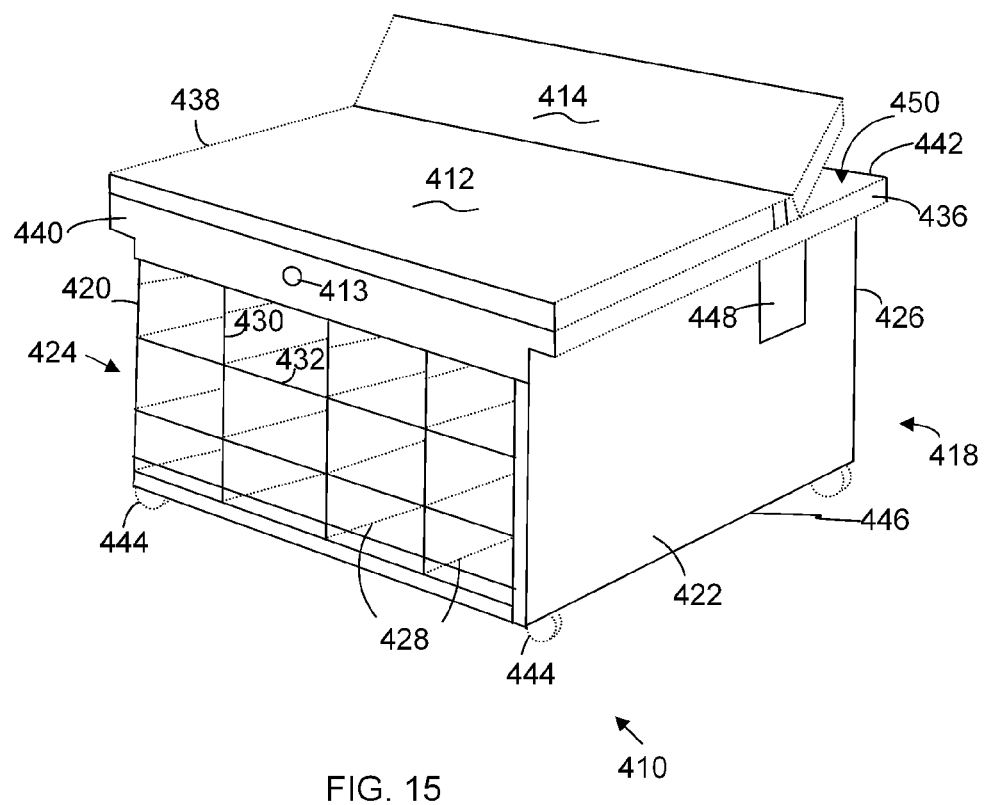
FIG. 15 is a three dimensional view of a video/audio programming and charging system in accordance with an embodiment of the present invention.

FIG. 15 depicts a programming and charging system implementing an embodiment of the present invention. A cart 410 as depicted in FIG. 15 includes a left top panel 412 and a right top panel 414 hingedly connected together atop a base 418. The preferred base 418 includes a substantially rectangular back panel 420, a substantially rectangular front panel 422, a left side 424 and a right side 426. The left side 424 and right side 426 include a plurality of storage bins 428 interposed between the front panel 422 and the back panel 420. In the preferred embodiment, the storage bins 428 are substantially rectangular openings into the left side 424 and right side 426 of the base 418, evenly spaced between the front panel 422 and the back panel 420, each of the openings defined by vertical walls 430 and horizontal walls 432 substantially parallel to the front panel 422 and back panel 420.

In other embodiments, the storage bins 428 may be other shapes, including but not limited to circular, or triangular. In the preferred embodiment, the vertical walls 430 and horizontal walls 432 defining the openings do not run the entire length of the front panel 422 and back panel 420, with separate sets of storage bins 428 on the left side 424 of the base 418 and the right side 426 of the base 418, rather than continuous storage bins 428 running the entire length of the front panel 422 and back panel 420.

At the top of the base 418 in FIG. 15 is a front storage wall 436 extending outwardly and upwardly from the front panel 422 of the base 418. In the embodiment there is a corresponding rear storage wall 438 extending outwardly and upwardly from the back panel 420 of the base 418. Additionally, a left storage wall 440 extends upwardly from the left side 424 of the base 418, and a right storage wall 442 extends upwardly from the right side 426 of the base 418. The front storage wall 436, rear storage wall 438, left storage wall 440, and right storage wall 442 define a substantially rectangular charging/programming area 450.

The left top panel 412 and right top panel 414 are hingedly connected to each other, and to the front storage wall 436 and rear storage wall 438, such that the left top panel 412 in the down position (FIG. 15) covers the left half of the charging/programming area 450. When the left top panel 412 is in the up position, the left portion of the charging/programming area 450, and any contents therein, are exposed. Similarly, in the preferred embodiment, the right top panel 414 is hingedly connected to the left top panel 412, and the front storage wall 436 and rear storage wall 438, such that when the right top panel is in the down position, the right half of the charging/programming area 450 is covered. When the right top panel 414 is in the up position (as shown in FIG. 15), the right side of the charging/programming area 450, and any contents therein, are exposed.

A lock 413 is provided for securing and/or locking the left top panel 412 to the base 418 when the left top panel 412 is in the down position, ensuring that the left top panel 412 does not open, for safety and security purposes. Similarly, a lock is provided for securing and/or locking the right top panel 414 to the base 418 when the right top panel 414 is in the down position.

The cart 410 depicted in FIG. 15 also includes steerable caster wheels 444 for rolling the cart 410 from one location to another. As would be known to one of skill in the art, the steerable caster wheels 444 may be configured to rotate about an axis to allow the cart 410 to turn to the right or left when pulled or pushed to the right or left. Similarly, the preferred embodiment of the cart 410 of FIG. 15 includes a tow bar 446 to allow the cart 410 to be pulled from one location to another. The preferred tow bar 446 is configured to attach to the back panel 420 of another cart 410 such that multiple carts may be connected together by the tow bar 446 of each cart 410, and the multiple carts 410 may be moved together by pulling the tow bar 446 of the lead cart 410.

The cart 410 depicted in FIG. 15 further includes a power source for providing power to the charging/programming area 450, enabling the cart 410 to perform the charging and programming functions as described below. The power source is a rechargeable power source, such as a battery, contained within the cart 410 that may be recharged at any standard electrical outlet. In other embodiments, the cart 410 may not contain a rechargeable power source, and may be configured to allow the cart to be plugged into any standard electrical outlet to provide power to the cart 410 to perform the charging and programming functions as described below. In yet other embodiments, the cart 410 may be configured to be powered via a non-standard electrical outlet.

Figure 16:
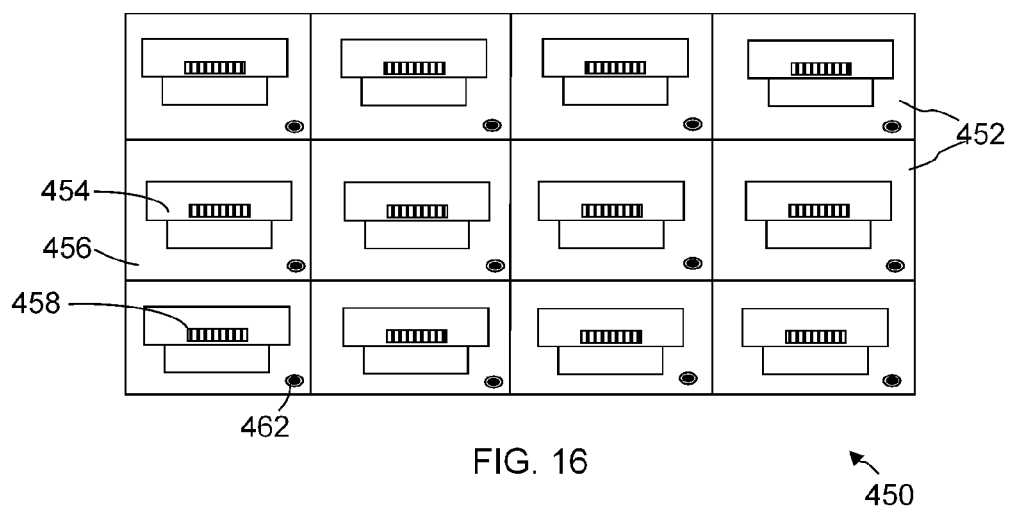
FIG. 16 is a top view of a securing mechanism for a plurality of personal audio/video devices.
Figure 17:
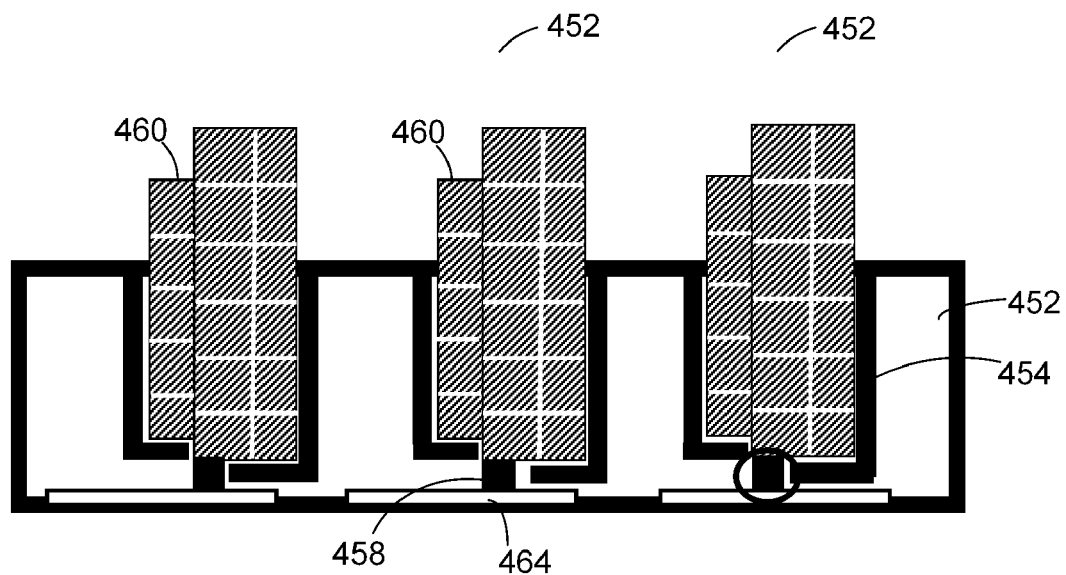
FIG. 17 is a side cut-away view of the securing mechanism depicted in FIG. 16.

FIG. 16 depicts the charging/programming area 450 depicted in FIG. 15. As shown in FIG. 16, the charging/programming area 450 includes a plurality of docking ports 452, for holding a plurality of audio/video devices 460 (FIG. 17). Each docking port 452 is configured to hold one audio/video device 460. Each docking port 452 includes a base portion 456 with a receiver pocket 454 disposed therein, the receiver pocket 454 being an opening in the base portion 456 for receiving an audio/video device 460. Each receiver pocket 454 is configured to receive at least one audio/video device 460, and may be configured in alternate embodiments to receive a plurality of audio/video devices 460. In other embodiments, the receiver pocket 454 may be configured to receive a portion of the audio/video device 460, where the portion of the audio/video device 460 that may need to be charged and/or programmed is detachable from the rest of the audio/video device 460.

As depicted in FIG. 16, the receiver pocket 454 in some embodiments may be an opening in the base portion 456 that is substantially rectangular in shape. However, the receiver pocket 454 in other embodiments may be openings of other shapes. In yet other embodiments, the docking port 452 may comprise a base portion 456 containing a receiver pocket 454 extending upwardly (not shown) from the base portion 456, rather than being an opening into the base portion 456 as depicted in FIG. 16.

In the preferred embodiment, the receiver pocket 454 includes a charge/program connector 458. The charge/program connector 458 receives power from the power source of the cart 410. The charge/program connector 458 is configured to engage the audio/video device 460 when the audio/video device 460 is seated in the receiver pocket 454, such that electrical current and/or information or digital data may be transmitted between the receiver pocket 454 and the audio/video device 460.

In the preferred embodiment, the base portion 456 also includes a charge indicator light 462. The charge indicator light 462 is configured to illuminate in a first color when the audio/video device 460 is connected to the charge/program connector 458, indicating that a proper connection has been made. The charge indicator light 462 is further configured to illuminate, in a second color when a proper connection has been made, and after the power source of the audio/video device 460 is fully charged.

FIG. 17 is a side cut-away view of the preferred docking port 452 depicted in FIG. 16, showing a cut-away view of sample audio/video devices 460 engaged in docking ports 452. As depicted in FIG. 17, each audio/video device 460 fits into a receiver pocket 454 formed in the base portion 456 of each docking port 452. When engaged with the docking port 452, the audio/video device 460 in the preferred embodiment fits snuggly inside the receiver pocket 454, and the audio/video device 460 engages with the charge/program connector 458. The charge/program connector 458 further includes logic to control the connection, which in the preferred embodiment as illustrated in FIG. 17, is contained on a charge/program printed circuit board 464 ("PCB"). As would be known to one of ordinary skill in the art, there are various ways in which the connection may be made such that information and/or digital data may be passed from the cart 410 through the charge/program connector 458 to at least one audio/video device 460, while at the same time power is passed to at least one audio/video device 460 to charge the power source of the audio/video device 460.

Figure 18:
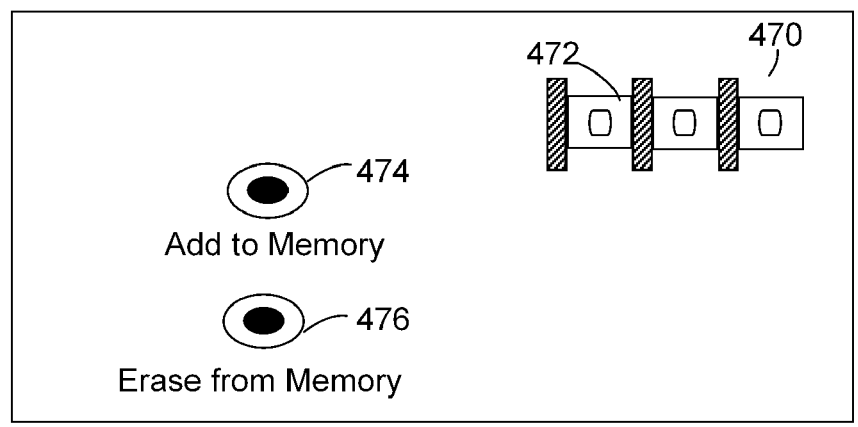
FIG. 18 is a front view of a control panel of the embodiment depicted in FIG. 15.

There are also a variety of ways contemplated to select the information to be input into the audio/video device 460. For example, the cart 410, in FIG. 15 includes a control panel 448 where instructions and/or information may be manually selected by an operator for transfer to the audio/video device 460 when the audio/video device 460 is fitted into receiver pocket 454 of the docking port 452 as depicted in FIG. 17. FIG. 18 depicts an example control panel 448. The control panel 448 would include one or more channel selectors 470. In the embodiment depicted in FIG. 18, a single channel selector 470 comprises a series of selector wheels 472 to allow an operator to select a desired value.

The control panel 448 also includes an add to memory activator 474 and an erase from memory activator 476. The add to memory activator 474 may be activated to add a frequency selected on the channel selector 470 to the memory of one or more audio/video devices 460 contained within the charging/programming area 450 of the cart 410. The selector wheels 472 of the channel selector 470 are manipulated by the operator to display a desired frequency. Once the desired frequency is selected on the channel selector 470, the add to memory activator 474 is activated by the operator. Upon activation of the add to memory activator 474, the frequency selected on the channel selector 470 is programmed into the memory of each audio/video device 460 that is fitted into a docking port 452 when the add to memory activator 474 is activated. In different implementations, the memory of the audio/video devices 460 may include software, hardware, and or firmware, and the programming of the memory may take place in a variety of manners that would be known to one of skill in the art.

Similarly, the erase from memory activator 476 may be activated to erase the frequency selected on the channel selector 470 from the memory of one or more audio/video devices 460 contained within the charging/programming area 450 of the cart 410. In the preferred embodiment, the selector wheels 472 of the channel selector 470 are manipulated by the operator to display a desired frequency. Once the desired frequency is selected on the channel selector 470, the erase from memory activator 476 is activated by the operator. Upon activation of the erase from memory activator 476, the frequency selected on the channel selector 470 is erased from the memory of each audio/video device 460 that is fitted into a docking port 452 when the erase from memory activator 476 is activated. In different implementations, the memory of the audio/video devices 460 may include software, hardware, and or firmware, and the erasing of the memory may take place in a variety of manners that would be known to one of skill in the art.

In different embodiments, the activators may be buttons, switches or other activation devices. Similarly, in other embodiments, the channel selector 470 may be a digital pad with a display, allowing manual entry of frequencies and other information by an operator through the digital pad. In yet other embodiments, the control panel 448 could include a receiving mechanism (not shown) allowing information to be transmitted to the cart 410 from a remote device, including an infra-red or other wireless device, rather than manual entry of the information on the control panel 448 itself by the operator.

Operation

An exemplary use and operation of the video/audio system and associated methodology are described hereafter.

Assume for illustrative purposes that a spectator would like to attend an auto race and would like to have access to an in-car view from a camera within his favorite driver's car. In addition, the spectator would also like to continuously hear the dialogue between the aforementioned driver and the driver's pit crew, as well as the comments provided by his favorite radio commentator. It should be apparent that other views and/or sounds may be desirable in other examples.

In the past, the spectator would attend the race and acquire (as well as tune) a radio to receive the commentator's comments and a radio to receive the radio signals transmitted between the driver and the driver's pit crew. Then, the spectator would locate a monitor at the stadium displaying the in-car view that he desires to see, assuming that such a monitor is provided. The spectator would then remain within sight of the monitor and listen to the two radios. If the monitor is not located in a desirable location for viewing the race, the spectator would have to choose between viewing the monitor and viewing the race at a desirable location. Furthermore, the handling of multiple radios is generally cumbersome and distracting.

When the user attends the race and the user is provided a receiver 75 for his individual use. In the preferred embodiment, the receiver 75 is located at the spectator's seat within the stadium. However, the receiver 75 may be located at other convenient locations, and when the combined signal 71 is transmitted via a wireless transmitter, the spectator may carry the receiver 75 around with him to any desirable location in or around the stadium.

The receiver preferably includes the HMD 250 depicted by FIG. 6. Therefore, the spectator dons the HMD 250 such that the forehead brace 161 is pressed against his forehead and each noise reduction device 252a and 252b covers one of the spectator's ear. Then the spectator adjusts the length of the strap 156 until the HMD 250 properly fits about his head. The spectator then manipulates buttons or other types of switches at user interface 94 to control which signal 84 is output by multiplexer 88 and, therefore, which signals 22 and 25 are transmitted via cable 171 to the HMD 250. Through techniques known in the art, images defined by the video signals transmitted along cable 171 are shown by display device 101 (e.g., LCDs 175), and sounds defined by the audio signals transmitted along cable 171 are produced by speakers 103a and 103b, which are respectively located within devices 252a and 252b. Accordingly, the spectator may use the receiver 75 to see the desired view of the race (i.e., the in-car view) and to hear the desired sounds of the race (i.e., the dialogue between the driver and the. driver's pit crew, and the comments from the radio commentator).

In this regard, the interface device 28 preferably receives at least a video signal 22 defining the in-car view of his favorite driver and a plurality of audio signals 25 defining the dialogue between his favorite driver and the driver's pit crew, as well as the comments from his favorite radio commentator. At least one of the audio combiners 52 combines these audio signals 25 into a combined signal 55. One of the signal modulators 61 receives this combined signal 55 and the video signal 22 defining the desired in-car view. This video signal 22 is modulated and combined with the foregoing combined signal 55 by one of the signal modulators 61 to create a modulated signal 64. This modulated signal 64 is combined with other modulated signals 64 and transmitted to the spectator's receiver 75 via combiner 67.

The demodulator 82 in the spectator's receiver 75 demodulates and separates the received signal 71 into separate signals 84. Based on the control signals 92 received from user interface 94, the multiplexer 88 allows only the signal 84 defined by the aforementioned video and audio signals 22 and 25 to pass. Therefore, these video and audio signals 22 and 25 are respectively transmitted to the display device 101 and speakers 103a and 103b and the spectator may enjoy the view and sounds that he selected.

It should be noted that it is not necessary for the spectator to keep the receiver 75 within a stadium. In this regard, the signal 71 may be transmitted via satellites and/or communication networks to various locations around the world, and the spectator may select the view and sounds he prefers the most from just about any location capable of receiving signal 71.

It should also be noted that the receiver 75 may be retrieved from the spectator after the spectator is finished viewing the event so that the receiver can be provided to another spectator for another event at the stadium. Each spectator is preferably charged a usage fee for the spectator's use of the receiver 75. It should be noted that a portion of the receiver 75 may be installed at the spectator's seat such that user only needs to retrieve the HMD 151 and/or other components of the receiver 75 during the event and return the retrieved components after the event. Furthermore, the entire receiver 75 may be installed at the spectator's seat such that spectator only needs to pay for the use of the receiver.

In addition, it may be desirable for one of the audio signals 25 to have a higher amplitude than the other audio signals 25. For example, a spectator may desire to hear comments from a radio commentator unless a communication between his favorite driver and the driver's pit crew occurs. When the a communication between the driver and the driver's crew occurs, the spectator would rather listen to this communication instead of the radio commentator's comments.

Accordingly, one of the audio combiners 52 is preferably used to combine a first audio signal 25 defining the radio commentator's comments and a second audio signal defining the communications between the driver and the driver's pit crew preferably increases the amplitude of the second audio signal 25 relative to the first audio signal. This may be accomplished by increasing the amplitude of the second audio signal 25 with an amplifier or by attenuating the amplitude of the first audio signal 25 with an attenuator. Therefore, when the combined signal 55 produced by the aforementioned audio combiner 52 is ultimately received by the spectator's receiver 75, which produces sound based on this combined signal 55, the user hears the radio commentator's comments when there is no communication between the driver and the driver's crew. However, when there is a communication between the driver and the driver's crew, this communication is louder than the radio commentator's comments. Accordingly, the spectator can clearly hear the communications between the driver and the driver's crew even though the spectator's ability to clearly hear the radio commentator's comments is impaired. It should be noted that the foregoing techniques for increasing the amplitude of one audio signal 25 relative to others may be employed for different combinations of audio signals 25 and is not limited to the exemplary combination described above.

Furthermore, it should also be noted that the system has been described herein in the context of auto racing. However, the system 20 may be useful in other applications as well. The system 20 would be useful in any application where it is desirable for the user to control the types of views and sounds of an event that are presented to the user. For example, the present invention could be particularly useful in any type of sporting event or other type of event attended by a large number of people.

The system is also capable of storing, vending, programming and/or charging audio/video devices 460. In an embodiment, the system programs and/or charges personal audio/video devices 460 for use in association with events at a stadium as previously disclosed in copending non-provisional U.S. patent application Ser. Nos. 09/322,411, 09/386,613, and 09/837,128, which have been incorporated herein by reference. The personal audio/video devices 460 may be stored in the charging/programming area 450 of the cart 410 when the personal audio/video devices 460 are not being used, with the left top panel 412 (FIG. 15) and the right top panel 414 both in the down position and secured. Additionally, the storage bins 428 allow for storage of equipment associated with the personal audio/video devices 460 or detachable portions of the personal audio/video devices 460 that do not need to be programmed or charged.

The steerable caster wheels 444 and tow bar 446 allow the cart 410 or a plurality of carts 410 to be easily transported to different stadiums, including stadiums in different geographic locations, or to different events at the same stadium. The hingedly connected top panels 412 and 414 allow the personal audio/video devices to be displayed and/or vended to potential users at a stadium or event, if desired, by unlocking and placing the left top panel 412 and/or right top panel 414 into the open position. Similarly, the personal audio/video devices 460 may be collected from users at the conclusion of an event and stored within the cart 410 until the personal audio/video devices 460 are vended or provided to users at the next stadium or event.

In the preferred embodiment, the cart 410 further allows programming the memory of and/or charging of the power source of one or more of a plurality of personal audio/video devices 460 when each personal audio/video device 460 is placed in a receiver pocket 454 in the charging/programming area 450 of the cart 410. As depicted in FIG. 17, when a personal audio/video device 460 is placed in the preferred docking port 452, the personal audio/video device 460 seats snuggly into the receiver pocket 454. The receiver pocket 454 may be formed from molded plastic or other like material.

When placed in the receiver pocket 454, the personal audio/video device 460 engages the charge/program connector 458 contained within the preferred docking port 452, establishing a connection. The charge/program connector 458 allows electric current to flow between cart 410 and the personal audio/video device 460, charging the power source of the personal audio/video device 460. Additionally, the charge/program connector 458 in the preferred embodiment is controlled by logic allowing communication of information and/or data between the cart 410 and the personal audio/video devices 460. In the preferred embodiment, the logic is contained on a charge/program printed circuit board ("PCB") 464.

When one or more personal audio/video devices 460 are placed in the receiver pocket 454 and engage the charge/program connector 458, the power source of one or more personal audio/video device 460 may be charged through the charge/program connector 458 while the personal audio/video devices 460 are being stored in the charging/programming area 450 of the cart 410. Each docking port 452 contains a charge indicator light 462 to indicate when the personal audio/video device 460 is properly seated in the docking port 452, such that the personal audio/video devices 460 is engaged with the charge/program connector 458.

The charge indicator light 462 in the preferred embodiment is an LED light which illuminates a first color when the personal audio/video device 460 is properly seated in the docking port 452, and the power source of the personal audio/video device 460 is being charged through the charge/program connector 458. In the preferred embodiment, the charge/program PCB 464 contains logic to detect when the power source of a personal audio/video device 460 is fully charged. When the power source of a personal audio/video device 460 is fully charged, the charge indicator light 462 for the docking port 452 containing the fully charged personal audio/video device 460 illuminates a second color indicating a proper connection, and that the personal audio/video device 460 is fully charged.

Further, the charge/program PCB 464 contains logic to enable only some of a plurality of personal audio/video devices 460 to be charged if desired. In this embodiment, less than all of the plurality of personal audio/video devices 460 contained in the charging/programming area 450 of the cart 410 may be charged, and any combination of the plurality of personal audio/video devices 460 may be selected for charging if desired, with the remaining unselected personal audio/video devices 460 not being charged through the charge/program connector 458.

Additionally, the logic, contained in the charge/program PCB 464 allows the memory of the personal audio/video devices 460 to be "programmed" with various information desired.

In one embodiment, the information "programmed" into the memory of the personal audio/video devices 460 will include assigning specific audio frequencies and video frequencies for each selectable channel of the personal audio/video devices 460, such as that discussed above in relation to the add to memory activator 474 and erase from memory activator 476. In this embodiment, the specific audio frequencies and video frequencies assigned to the selectable channels of the personal audio/video devices 460 will correspond to the audio frequencies and video frequencies available for use at the next stadium or event at which the personal audio/video devices 460 will be used. In this embodiment, the "programming" could further include erasing or deleting from the memory of the personal audio/video devices 460 the audio frequencies and video frequencies used by the personal audio/video devices 460 at the previous stadium or event.

In other embodiments, the "programming" may include upgrades, updates, alterations, or modifications to the software or firmware contained in one or more of the personal audio/video devices 460 and/or in the memory of one or more of the personal audio/video devices 460 placed in the charging/programming area 450 of the cart 410. As an example, and in no way intended to limit the present invention, the personal audio/video devices 460 may include instructions contained in software, firmware, and/or hardware of the audio/video devices 460 to enable the personal audio/video devices 460 to operate. These operating instructions may include software code stored in the memory of the audio/video devices 460. The "programming" in this embodiment will include, transferring new software code and/or new portions of software code into the memory of the audio/video devices 460 to upgrade the software code in the memory of the audio/video devices 460, enhancing performance. This upgrading may be performed in a variety of manners that would be known to one of ordinary skill in the art.

As with the charging, specific personal audio/video devices 460 placed or stored in the charging/programming area 450 of the cart 410 may be selected to receive "programming" information or data, while other personal audio/video devices 460 are not "programmed." Similarly, one or any number of personal audio/video devices 460 may be selected to receive a first set of "programming" information or data, while a second number of personal audio/video devices 460 may be selected to receive a second and different set of "programming" information or data.

By way of example, and in no way intended to limit the present invention, a first desired number of the personal audio/video devices 460 contained in the charging/programming area 450 of a cart 410 may be selected to receive a first set of audio frequencies and video frequencies, while a second desired number of the personal audio/video devices 460 contained in the unit charging/programming area of the same cart 410 may be selected to receive a second and different set of audio frequencies and video frequencies, and a third desired number of the personal audio/video devices 460 contained in the charging/programming area 450 of the same cart 410 may have all audio frequencies and video frequencies erased from memory.

The information or data to be "programmed" into one or more of the personal audio/video devices 460 may be communicated to the cart 410 by the operator in a variety of ways, including manually on a control panel 448 located on the cart 410 (FIG. 15), or by a remote device communicating the information to the cart 410, either through a direct connection or wirelessly, using methods that would be know to one skilled in the art.

In a preferred embodiment depicted in FIG. 15 and FIG. 17, a control panel 448 may be used to select information to be "programmed" into one or more of the personal audio/video devices 460. A variety of manual input mechanisms may be on the control panel 448, and as indicated in FIG. 17, a preferred embodiment includes a channel selector 470 by which various audio frequencies and/or video frequencies may be selected to be "programmed" into the memory of the personal audio/video devices 460.

In this embodiment, the control panel 448 further includes an add to memory activator 474 and an erase from memory activator 476, which may be buttons, switches or other activators. By selecting a value on the channel selector 470 and activating one of the activators 474 and 476, the value on the channel selector 470 may be "programmed" into, or erased from, the memory of one or more of the personal audio/video devices 460. Additionally, in other embodiments, the control panel 448 may include a channel selector 470, which includes a keypad with a display (not shown).

In other embodiments, the control panel may include a port, connector, or wireless receiver allowing an operator to use a remote device to communicate to the cart 410 the desired information or data to be "programmed" into one or more of the personal audio/video devices 460. Similarly, in some embodiments, the cart 410 may not have a control panel 448 at all, but instead just a port, connector, or wireless receiver allowing a remote device to communicate to the cart 410, the desired information or data to be "programmed" into one or more of the personal audio/video devices 460.

It should also be noted that the present invention has been described herein in the context of auto racing. However, the system may be useful in other applications as well. The cart 410 would be useful in any application where it is desirable for the user to control the types of views and sounds of an event that are presented to the user via personal audio/video devices 460. For example, the system could be particularly useful in any type of sporting event or other type of event attended by a large number of people.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the present invention and protected by the claims.

The invention claimed is:

1. A method for providing video content related to an entertainment event to a user, the method comprising:
   providing at least one of software and firmware configured to be transferred to a plurality of handheld devices having memory, programmable portable receivers and portable displays, the receivers programmed to communicate with a communications network;
   formatting a plurality of video signals related to the entertainment event into video content, said video signals being produced by different cameras located at the entertainment event;
   transmitting said video content wirelessly from a wireless transmitter of the communications network over a broadcast area encompassing at least a portion of the event, to said portable receivers located within the broadcast area, wherein the at least one of software and firmware enables the handheld device to allow users to select, at the corresponding individual handheld device, from said video content, and to display, via the corresponding individual portable display, an image defined by said video content selected by the individual corresponding user;
   formatting a plurality of audio signals associated with the event into audio content; and
   transmitting said audio content wirelessly over the broadcast area to the handheld devices, the handheld devices having speakers, the audio content being formatted in a manner that allows users to select the audio content to play over the speakers of the corresponding portable receiver, wherein the audio content is transmitted separately from the video content.

2. The method of claim 1, wherein said formatting separates said video content, prior to transmission, into at least first and second video channels that are selected by and transmitted to different corresponding first and second handheld devices.

3. The method of claim 1, wherein the transmitting includes broadcasting the video content over the broadcast area encompassing the event to permit users to carry said handheld devices about the broadcast area and choose where the users would like to view the video content.

4. The method of claim 1, wherein the event is a car race and the video content selected by the spectator carries video signals associated with a desired in-car view.

5. The method of claim 1, further comprising locating a plurality of cameras at the event to obtain the different views of the event produced as the video signals.

6. The method of claim 1, wherein said video content includes first and second video signals associated with the event and said audio content includes first and second audio signals associated with the event, the first audio and video signals being transmitted to a first handheld device, the second audio and video signals being transmitted to a second handheld device.

7. The method of claim 1, wherein the event is a car race and said audio content includes dialogue between drivers and the driver's pit crews.

8. The method of claim 1, wherein the audio content and video content are wirelessly transmitted at different points in time during the event.

9. The method of claim 1, further comprising charging usage fees before authorizing the handheld devices to display the video content.

10. The method of claim 1, wherein the at least one of software and firmware transferred to the handheld devices further comprising network related programming information for programming the portable receivers to a frequency range associated with a second communications network.

11. The method of claim 1, further comprising storing the at least one of software and firmware transferred to the handheld devices in memory of the handheld devices, the at least one of software and firmware including network related programming information identifying at least one frequency range associated with the communications network that carries the video content.

12. The method of claim 1, wherein the formatting includes, within the video content, at least first and second video signals multiplexed over different unique first and second channels.

13. The method of claim 1, further comprising wirelessly receiving, at the handheld devices, the at least one of software and firmware, which is stored in memory and used by signal processing logic in the handheld devices to condition the video content to be compatible with the display.

14. The method of claim 1, wherein the handheld device includes signal processing logic, the at least one of software and firmware transferred to the handheld device further comprising programming information that enables the signal processing logic to condition video content received by the receivers to be compatible with the displays.

15. The method of claim 14, wherein the at least one of software and firmware transferred to the handheld device further comprising programming information for programming the receiver to communicate with different communications networks.

16. The method of claim 1, wherein the audio content includes an audio signal being generated from at least one of a microphone located close to a sideline of the event, a microphone located in a helmet of a player, a microphone located to pick up sounds from participants in the event, and a commentator microphone.

17. A programmable portable wireless handheld device to receive video content related to an entertainment event, the portable wireless handheld device comprising:
 memory to store programming information;
 a programmable receiver configured to receive video content transmitted wirelessly from a communications network, the network having at least one wireless transmitter with a broadcast area encompassing at least a portion of the entertainment event, said video content including video signals being produced by at least one camera from a plurality of cameras at said event, wherein said receiver is programmed, based on the programming information stored in the memory, to communicate with the communications network that carries said video content;
 signal processing logic to condition the video content to be compatible with the display based on the programming information stored in the memory;
 a display configured to display images based on said video signals; and
 a user interface for selecting said video content for viewing by a user on said display.

18. The device of claim 17, wherein said event occurs at a stadium and said handheld device is configured to operate at or away from said stadium.

19. The device of claim 17, wherein said receiver permits the user to roam away from the event while said display intermittently displays images defined by said video signal.

20. The device of claim 17, wherein the receiver is programmed to multiple channels that carry audio content transmitted wirelessly to said receiver, said audio content being associated with the event, the device further comprising a speaker to play selected audio content that is carried over a channel selected at the user interface.

21. The device of claim 17, wherein the programming information includes network related programming information that programs the receiver to at least first and second channels separately conveying first and second video signals associated with first and second views, respectively, of the entertainment event.

22. The device of claim 17, wherein the receiver is configured to wirelessly receive at least one of upgrades, updates, alterations and modifications to the programming information, which is stored in the memory and used by the signal processing logic to condition the video content to be compatible with the display.

23. The method of claim 17, wherein the video content comprises at least two video signals produced by different cameras located at the event, the video signals defining different views of the event.

24. The device of claim 17, wherein the programming information includes content related programming information that enables the signal processing logic to condition the video content to be compatible with the display.

25. The device of claim 17, wherein the programming, information includes network related programming information that programs the receiver to a network frequency range associated with the communications network.

26. The device of claim 17, wherein the signal processing logic selects between first and second video signals produced by different cameras and corresponding to first and second views of the event, respectively, based on individual user selections at the user interface.

27. The device of claim 17, wherein the receiver is reprogrammable to different frequency ranges to communicate with different communications networks.

* * * * *